US009734377B2

(12) United States Patent
Sevier et al.

(10) Patent No.: US 9,734,377 B2
(45) Date of Patent: Aug. 15, 2017

(54) BAR CODE READING TERMINAL WITH VIDEO CAPTURING MODE

(71) Applicant: Hand Held Products, Inc., Fort Mill, SC (US)

(72) Inventors: Mitchel P. Sevier, West Monroe, NY (US); Michael J. Doren, Cicero, NY (US); Garrison Gomez, Marietta, NY (US); James Kosecki, Syracuse, NY (US); Daniel D. Yeakley, Monroe, NY (US); Sven M. A. Powilleit, Charlotte, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 15/330,856

(22) Filed: Nov. 7, 2016

(65) Prior Publication Data
US 2017/0116450 A1    Apr. 27, 2017

Related U.S. Application Data

(60) Continuation of application No. 13/953,277, filed on Jul. 29, 2013, now Pat. No. 9,489,558, which is a
(Continued)

(51) Int. Cl.
*G06K 7/14* (2006.01)
*H04N 21/61* (2011.01)
(Continued)

(52) U.S. Cl.
CPC ....... *G06K 7/1495* (2013.01); *H04N 21/4223* (2013.01); *H04N 21/44008* (2013.01);
(Continued)

(58) Field of Classification Search
USPC .................................................... 235/462.15
See application file for complete search history.

(56) References Cited

U.S. PATENT DOCUMENTS 4,091,270 A    5/1978  Musch et al.
4,825,058 A    4/1989  Poland
(Continued)

FOREIGN PATENT DOCUMENTS

EP    0978990 A2    2/2000
EP    0978990 A3    4/2001
(Continued)

*Primary Examiner* — Michael G Lee
*Assistant Examiner* — David Tardif
(74) *Attorney, Agent, or Firm* — Additon, Higgins & Pendleton, P.A.

(57) ABSTRACT

A bar code reading terminal can, in one embodiment, include a two-dimensional image sensor and an imaging assembly. The terminal can be configured, in response to receipt of a trigger signal, to buffer a set of frames and subject each frame of the set of frames to a decode attempt. The terminal can also be configured to convert the convert the captured set of video frames into a compressed video format, and transfer the resulting video file to a file server or to one or more playback devices, in response to a user interface action, or in response to difficult read condition having been detected. The terminal can also be configured to establish two-way video- and audio-communication with a remote video- and audio-streaming device. The video capturing and streaming operation of the terminal can be controlled remotely from a playback device via web interface.

20 Claims, 15 Drawing Sheets

Related U.S. Application Data division of application No. 11/823,838, filed on Jun. 28, 2007, now Pat. No. 8,496,177.

(51) Int. Cl.

| | | |
|---|---|---|
| *H04N 21/44* | (2011.01) | |
| *H04N 21/4402* | (2011.01) | |
| *H04N 21/854* | (2011.01) | |
| *H04N 21/6336* | (2011.01) | |
| *H04N 21/4223* | (2011.01) | |

(52) U.S. Cl.
CPC . *H04N 21/440236* (2013.01); *H04N 21/6125* (2013.01); *H04N 21/6336* (2013.01); *H04N 21/85406* (2013.01)

(56) References Cited

U.S. PATENT DOCUMENTS

| | | |
|---|---|---|
| 4,868,375 A | 9/1989 | Blanford |
| 4,942,474 A | 7/1990 | Akimoto et al. |
| 5,212,777 A | 5/1993 | Gove et al. |
| 5,256,865 A | 10/1993 | Wike, Jr. et al. |
| 5,262,623 A | 11/1993 | Batterman et al. |
| 5,286,960 A | 2/1994 | Longacre, Jr. et al. |
| 5,294,783 A | 3/1994 | Hammond, Jr. et al. |
| 5,296,690 A | 3/1994 | Chandler et al. |
| 5,304,787 A | 4/1994 | Wang |
| 5,305,122 A | 4/1994 | Hayashi et al. |
| 5,311,001 A | 5/1994 | Joseph et al. |
| 5,323,327 A | 6/1994 | Carmichael et al. |
| 5,343,028 A | 8/1994 | Figarella et al. |
| 5,378,881 A | 1/1995 | Adachi |
| 5,396,054 A | 3/1995 | Krichever et al. |
| 5,410,141 A | 4/1995 | Koenck et al. |
| 5,414,251 A | 5/1995 | Durbin |
| 5,414,521 A | 5/1995 | Ansley |
| 5,420,409 A | 5/1995 | Longacre, Jr. et al. |
| 5,420,943 A | 5/1995 | Mak |
| 5,422,470 A | 6/1995 | Kubo |
| 5,428,212 A | 6/1995 | Tani et al. |
| 5,444,230 A | 8/1995 | Baldwin |
| 5,510,604 A | 4/1996 | England |
| 5,513,264 A | 4/1996 | Wang et al. |
| 5,524,068 A | 6/1996 | Kacandes et al. |
| 5,537,431 A | 7/1996 | Chen et al. |
| 5,591,955 A | 1/1997 | Laser |
| 5,638,465 A | 6/1997 | Sano et al. |
| 5,642,442 A | 6/1997 | Morton et al. |
| 5,666,167 A | 9/1997 | Tults |
| 5,702,059 A | 12/1997 | Chu et al. |
| 5,703,349 A | 12/1997 | Meyerson et al. |
| 5,710,417 A | 1/1998 | Joseph et al. |
| 5,714,745 A | 2/1998 | Ju et al. |
| 5,756,981 A | 5/1998 | Roustaei et al. |
| 5,784,102 A | 7/1998 | Hussey et al. |
| 5,801,962 A | 9/1998 | Sheu et al. |
| 5,818,028 A | 10/1998 | Meyerson et al. |
| 5,821,518 A | 10/1998 | Sussmeier et al. |
| 5,821,523 A | 10/1998 | Bunte et al. |
| 5,834,754 A | 11/1998 | Feng et al. |
| 5,848,064 A | 12/1998 | Cowan |
| 5,867,594 A | 2/1999 | Cymbalski |
| 5,867,595 A | 2/1999 | Cymbalski |
| 5,877,487 A | 3/1999 | Tani et al. |
| 5,880,451 A | 3/1999 | Smith et al. |
| 5,910,653 A | 6/1999 | Campo |
| 5,914,476 A | 6/1999 | Gerst et al. |
| 5,917,945 A | 6/1999 | Cymbalski |
| 5,932,862 A | 8/1999 | Hussey et al. |
| 5,949,054 A | 9/1999 | Karpen et al. |
| 5,979,763 A | 11/1999 | Wang et al. |
| 5,992,753 A | 11/1999 | Xu |
| 5,998,752 A | 12/1999 | Barton et al. |
| 6,015,088 A | 1/2000 | Parker et al. |
| 6,019,286 A | 2/2000 | Li et al. |
| 6,062,475 A | 5/2000 | Feng |
| 6,064,763 A | 5/2000 | Maltsev |
| 6,070,800 A | 6/2000 | Fujita et al. |
| 6,082,619 A | 7/2000 | Ma et al. |
| 6,123,261 A | 9/2000 | Roustaei |
| 6,129,278 A | 10/2000 | Wang et al. |
| 6,170,749 B1 | 1/2001 | Goren et al. |
| 6,176,428 B1 | 1/2001 | Joseph et al. |
| 6,232,973 B1 | 5/2001 | Dow et al. |
| 6,304,313 B1 | 10/2001 | Honma |
| 6,321,989 B1 | 11/2001 | Wilz, Sr. et al. |
| 6,347,163 B2 | 2/2002 | Roustaei |
| 6,347,743 B2 | 2/2002 | Wilz, Sr. et al. |
| 6,507,856 B1 | 1/2003 | Chen et al. |
| 6,539,422 B1 | 3/2003 | Hunt et al. |
| 6,540,142 B1 | 4/2003 | Alleshouse |
| 6,547,142 B1 | 4/2003 | Goren et al. |
| 6,561,428 B2 | 5/2003 | Meier et al. |
| 6,565,003 B1 | 5/2003 | Ma |
| 6,568,596 B1 | 5/2003 | Shaw |
| 6,585,159 B1 | 7/2003 | Meier et al. |
| 6,616,049 B1 | 9/2003 | Barkan et al. |
| 6,655,593 B2 | 12/2003 | Alleshouse |
| 6,678,412 B1 | 1/2004 | Shigekusa et al. |
| 6,688,523 B1 | 2/2004 | Koenck |
| 6,697,805 B1 | 2/2004 | Choquire et al. |
| 6,722,569 B2 | 4/2004 | Ehrhart et al. |
| 6,764,009 B2 | 7/2004 | Melick et al. |
| 6,764,011 B2 | 7/2004 | Entani |
| 6,772,947 B2 | 8/2004 | Shaw |
| 6,776,342 B1 | 8/2004 | Thuries et al. |
| 6,784,904 B2 | 8/2004 | Dow et al. |
| 6,811,088 B2 | 11/2004 | Lanzaro et al. |
| 6,812,995 B2 | 11/2004 | Honma |
| 6,834,807 B2 | 12/2004 | Ehrhart et al. |
| 6,902,114 B2 | 6/2005 | Hashimoto et al. |
| 6,908,034 B2 | 6/2005 | Alleshouse |
| 7,015,969 B2 | 3/2006 | Brown et al. |
| 7,111,787 B2 | 9/2006 | Ehrhart |
| 7,222,789 B2 | 5/2007 | Longacre, Jr. et al. |
| 7,251,499 B2 | 7/2007 | Ella et al. |
| 7,275,690 B1 | 10/2007 | White |
| 7,307,331 B2 | 12/2007 | Kipnis et al. |
| 7,743,911 B2 | 6/2010 | Romanchik |
| 7,750,435 B2 | 7/2010 | Rofougaran |
| 7,774,705 B2 | 8/2010 | Erol et al. |
| 7,795,700 B2 | 9/2010 | Rofougaran |
| 7,798,408 B2 | 9/2010 | Blumer et al. |
| 7,809,329 B2 | 10/2010 | Rofougaran |
| 7,835,157 B2 | 11/2010 | Tilmans et al. |
| 7,885,600 B2 | 2/2011 | Rofougaran |
| 7,893,790 B2 | 2/2011 | Van Delden |
| 7,899,394 B2 | 3/2011 | Rofougaran |
| 7,903,724 B2 | 3/2011 | Rofougaran |
| 7,908,420 B2 | 3/2011 | Rofougaran |
| 8,496,177 B2 | 7/2013 | Sevier et al. |
| 9,489,558 B2 | 11/2016 | Sevier et al. |
| 2001/0027995 A1* | 10/2001 | Patel ............. G06K 7/10861 235/383 |
| 2002/0171745 A1 | 11/2002 | Ehrhart |
| 2002/0183013 A1 | 12/2002 | Auckland et al. |
| 2004/0016814 A1 | 1/2004 | Muramatsu |
| 2004/0155110 A1 | 8/2004 | Ehrhart et al. |
| 2004/0189825 A1 | 9/2004 | Kawashima |
| 2004/0215654 A1 | 10/2004 | Eberwine et al. |
| 2005/0001035 A1* | 1/2005 | Hawley ............ G06K 7/10851 235/462.21 |
| 2006/0025102 A1 | 2/2006 | Kipnis et al. |
| 2006/0065732 A1 | 3/2006 | Barkan |
| 2006/0098874 A1 | 5/2006 | Lev |
| 2007/0063048 A1 | 3/2007 | Havens et al. |
| 2007/0131774 A1 | 6/2007 | Celestini |
| 2007/0152058 A1* | 7/2007 | Yeakley ............ G06F 17/2247 235/462.01 |
| 2008/0157897 A1 | 7/2008 | Tilmans et al. |
| 2008/0181186 A1 | 7/2008 | Rofougaran |
| 2008/0181287 A1 | 7/2008 | Rofougaran |
| 2008/0182613 A1 | 7/2008 | Rofougaran |

(56) References Cited

U.S. PATENT DOCUMENTS

| | | |
|---|---|---|
| 2008/0278370 A1 | 11/2008 | Lachner et al. |
| 2009/0001173 A1* | 1/2009 | Sevier ................. G06K 7/10851 |
| | | 235/462.41 |
| 2009/0006677 A1 | 1/2009 | Rofougaran |
| 2009/0033359 A1 | 2/2009 | Rofougaran |
| 2009/0036067 A1 | 2/2009 | Rofougaran |
| 2009/0037627 A1 | 2/2009 | Rofougaran |
| 2009/0121951 A1 | 5/2009 | Kaneda |
| 2009/0167457 A1 | 7/2009 | Melde et al. |
| 2009/0218657 A1 | 9/2009 | Rofougaran |
| 2009/0227205 A1 | 9/2009 | Rofougaran |
| 2009/0285135 A1 | 11/2009 | Rousu et al. |
| 2009/0323783 A1 | 12/2009 | Buris et al. |
| 2010/0022195 A1 | 1/2010 | Rofougaran |
| 2010/0077115 A1 | 3/2010 | Rofougaran |
| 2010/0079347 A1 | 4/2010 | Hayes et al. |
| 2010/0232474 A1 | 9/2010 | Rofougaran |
| 2010/0238075 A1 | 9/2010 | Pourseyed |
| 2010/0276498 A1 | 11/2010 | Rofougaran |
| 2010/0285634 A1 | 11/2010 | Rofougaran |
| 2011/0066774 A1 | 3/2011 | Rofougaran |
| 2014/0270792 A1* | 9/2014 | Zhang .................. H04B 10/116 |
| | | 398/118 |

FOREIGN PATENT DOCUMENTS

| | | | |
|---|---|---|---|
| EP | 1050793 | A2 | 4/2001 |
| EP | 1050793 | A3 | 9/2004 |
| GB | 2357209 | A | 6/2001 |
| WO | 9016033 | A2 | 12/1990 |

* cited by examiner

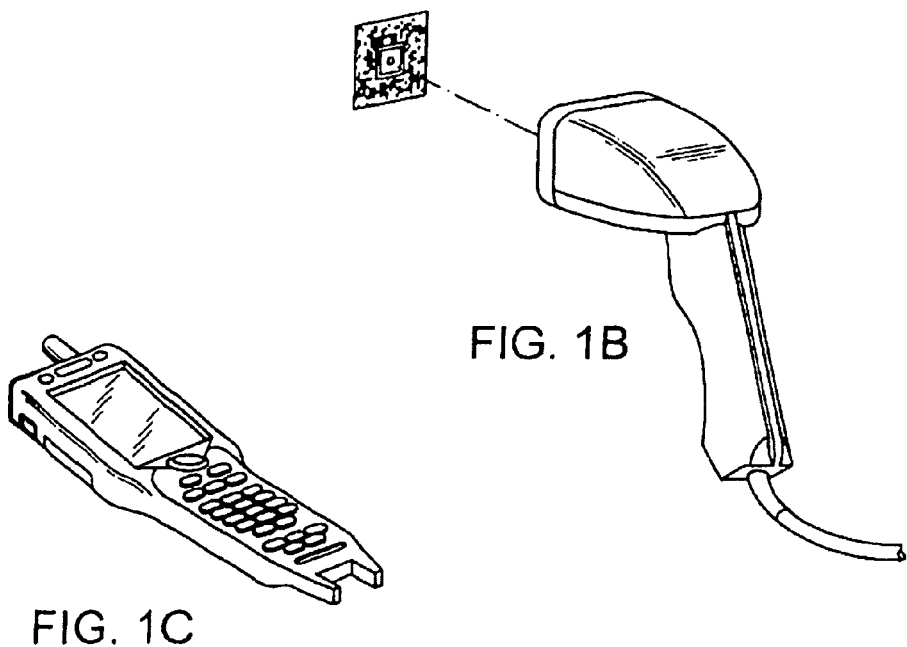
FIG. 1B
FIG. 1C
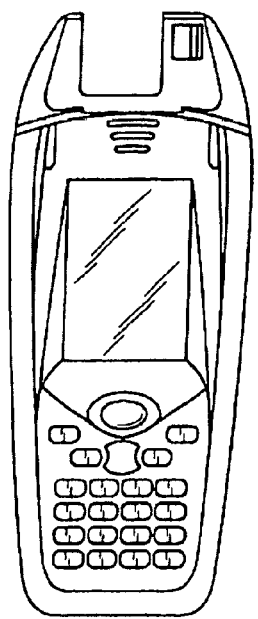
FIG. 1D

1210 List of active terminals

| Terminal name | Link quality | Send |
|---|---|---|
| Alice | 8 | [ ] |
| Bob | 5 | [X] |
| | | |
| | | |
| | | |
| | | |

1220 Message to the operator

1230 OK    1240 Cancel

FIG. 12

BAR CODE READING TERMINAL WITH VIDEO CAPTURING MODE

CROSS REFERENCE TO RELATED APPLICATIONS

The present application claims the benefit of U.S. patent application Ser. No. 13/953,277 for a Bar Code Reading Terminal with Video Capturing Mode filed Jul. 29, 2013 (and published Jun. 12, 2014 as U.S. Patent Publication No. 2014/0158770), now U.S. Pat. No. 9,489,558, which claims the benefit of U.S. patent application Ser. No. 11/823,838 for a Bar Code Reading Terminal with Video Capturing Mode filed Jun. 28, 2007 (and published Jan. 1, 2009 as U.S. Patent Publication No. 2009/0001173), now U.S. Pat. No. 8,496, 177. Each of the foregoing patent applications, patent publications, and patents is hereby incorporated by reference in its entirety.

FIELD OF TECHNOLOGY

This invention relates generally to two-dimensional bar code reading terminals and more specifically to two-dimensional bar code reading terminals that are capable of video capturing and recording.

BACKGROUND

Some bar code reading terminals make use of a two-dimensional (2D) imager to acquire and decode an image of a bar code symbol. The acquired image is typically decoded by an algorithm that can extract bar code data from the bar code symbol. Such bar code reading terminals can be hand held bar code reading terminals or fixed mounted bar code reading terminals on a stand or shelf as typically associated with a retail sales position.

Bar code reading terminals using 2D imagers vary widely in complexity and capability. Many 2D bar code reading terminals include imaging and decoding firmware used to image the bar code symbol and to extract bar code data from the image of the bar code symbol. Some of the most basic models of 2D bar code reading terminals convey the decoded bar code data to a connection or tap made between a computer and a corresponding computer keyboard, so that the bar code data can be transferred to the computer by emulating key strokes. Other bar code reading terminals transfer decoded bar code data to one or more host computers via a wired or wireless connection.

Occasionally, difficult read conditions can be encountered where a 2D bar code reading terminal images a bar code symbol, but cannot successfully decode the bar code symbol. Difficult bar code read conditions can often be attributed to the technique of the operator of the bar code reading terminal, the quality of the bar code, or the bar code imager or bar code reading algorithm. Infrequent or occasional difficult bar code read conditions are often overcome by re-scanning a bar code symbol. However, when difficult read conditions occur more frequently, lost productivity can cause wasted time and lost sales income. Also, products related to difficult bar code read conditions might be set aside for re-labeling and might later be forgotten and become lost, discarded, or spoiled. In some situations, a manager or operator supervisor might be contacted to discuss a difficult bar code reading situation.

There is presently no easy way to diagnose and correct failed bar code read conditions. Therefore, what is needed is a system and method that can automatically report difficult bar code read conditions with enough information to determine why one or more bar code symbols cannot be decoded.

BRIEF DESCRIPTION OF THE DRAWINGS

For a further understanding of these and objects of the invention, reference will be made to the following detailed description of the invention which is to be read in connection with the accompanying drawings, where:

FIG. 1B shows a perspective view of a hand held 2D bar code reading terminal.

FIG. 1C shows a perspective view of a mobile computer having a 2D bar code reading terminal.

FIG. 1D shows a perspective view of another type of portable 2D bar code reading terminal.

FIG. 12 shows an example of the graphical user interface allowing an operator of a bar code reading terminal in accordance with the embodiment shown in FIG. 8, to select from a list of symbolic strings describing active peer terminals, one or more terminals to send the video stream to.

The drawings are not necessarily to scale, emphasis instead generally being placed upon illustrating the principles of the invention. In the drawings, like numerals are used to indicate like parts throughout the various views.

DETAILED DESCRIPTION

Figure 1A:
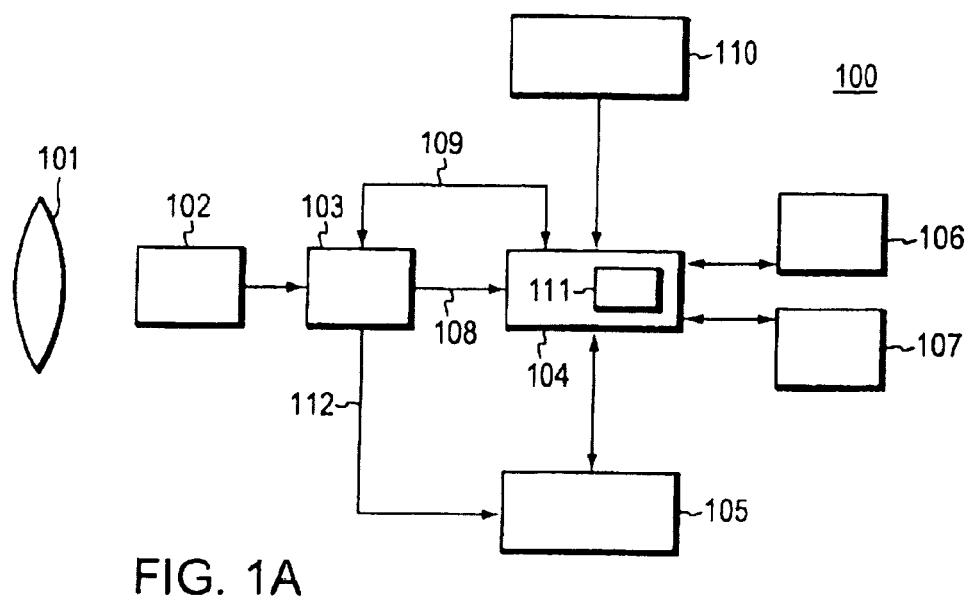
FIG. 1A shows a block diagram of one embodiment of a bar code reading terminal according to the invention.

FIG. 1A shows a block diagram of one embodiment of a bar code reading terminal according to the invention. Lens assembly 101 optically focuses an image of a bar code symbol onto two-dimensional image sensor 102. Image acquisition circuit 103 acquires an electronic representation of the 2D image, herein after referred to interchangeably as a "frame." Each frame taken on its own represents a single image. Also, each image can be typically represented as a 2D array of image pixels. Acquisition circuit 103 need not be a physically separate electronic circuit assembly. The electronic circuit performing the function of acquisition circuit 103 can be in part or entirely contained within a two-dimensional image sensor 102 physical assembly. The output of acquisition circuit 103 can typically be a raw digital representation of a frame, most typically in image map digital format. The image map digital format can be binary representation, but more typically is a gray scale or color image map digital format. Any alternative suitable digital representation of a frame can be used. Each frame can be stored in local memory 105. Each frame can be transferred directly to memory 105 via path 112, such as by direct memory access (DMA) or image data can be transferred via path 108 through control circuit 104 to memory 105. Control circuit 104 includes a central processing unit (CPU) 111. CPU 111 can typically be programmed to accept a trigger event (not shown) and to cause acquisition circuit 103 via signal and control line 109, to acquire one or more new images. Such events can include a manual depression of a trigger on a handheld bar code reading terminal, or a signal from a motion or proximity sensor that detects an object in the field of view of a bar code reading terminal that is ready to be imaged. CPU 111 can also be programmed to locate, identify, and decode a bar code symbol found in each frame. CPU 111 can also be programmed to determine if a difficult read condition has been detected in a particular frame. A bar code reading terminal 100 can include one or more hardware interface ports 106, such as a Universal Serial Bus (USB), a serial port such as an RS-232 port, and/or a Firewire port. Bar code reading terminal 100 can also include one or more network interfaces 107, including typically an Ethernet interface. Bar code reading terminal 100 can also include a wireless communication interface (e.g., Bluetooth or 802.11x family). Bar code reading terminal 100 can also optionally include an on board display 110.

FIG. 1B, FIG. 1C, and FIG. 1D show various types of bar code reading terminals suitable for use according to the invention. FIG. 1B shows a perspective view of a hand held 2D bar code reading terminal imaging a 2D bar code. FIG. 1C shows a mobile computer having an integral 2D bar code reading terminal. FIG. 1D shows yet another style of portable bar code reading terminal having an integral display and keyboard. It should be noted, however, that any suitable 2D bar code reading terminal physical form factor can be used to practice the invention.

According to one embodiment of the invention, one or more frames related to a failed attempt to read a bar code symbol on a surface are referenced or otherwise marked for later review. When later retrieved, the referenced or marked frames that were frames subjected to one or more failed bar code decoding attempts can be viewed to further understand why a difficult read condition has been detected. The bar code symbol may have been found (or not found) in a particular frame. One or more frames used in such a review can be the actual frames imaged at the time the bar code reading terminal attempted to read the bar code. It should also be noted that because the actual images related to a difficult read condition can be recorded in frames, when later viewed, these frames show exactly what was "seen" by the bar code reading terminal, directly through the image sensor "eyes" of the bar code reading terminal itself. A difficult read condition can typically be attributed to a failure by an operator to properly position the bar code reading terminal so that lens assembly 101 can focus the image of the bar code on two-dimensional image sensor 102, imaging a bar code type that the bar code reading terminal is not programmed to read, imaging a damaged or otherwise unreadable bar code symbol, or failure of a bar code decoding algorithm to decode the bar code symbol.

It can be highly desirable to be able to review one or more frames that caused a difficult read condition. One application for such a review can be to train bar code reading terminal operators. Often merely by viewing a sequence of actual frames from a difficult read condition, a more experienced bar code reading terminal operator can quickly identify the operator's error that caused the difficult read condition. In another application, one or more frames can be electronically conveyed to a customer support group, typically associated with a manufacturer of the bar code reading terminal. One or more members of the customer support group can identify probable causes for each difficult read condition based on one or more frames that the bar code reading terminal actually subjected to the bar code reading terminal's decoding process. The customer support group might also identify a potential problem with the bar code reading terminal ranging from an imaging problem to a problem related to a bar code reading terminal decode algorithm and forward such information to the manufacturing group for that bar code reading terminal for further analysis.

In yet another application, a bar code reading terminal can include an on onboard or a locally connected display 110 (FIG. 1) that can display one or more frames that were subjected to a difficult read condition. In the embodiment having an onboard display, the one or more frames can be viewed and analyzed locally by the operator of the bar code reading terminal. Such playback can be done immediately following the detection of a difficult read condition or at a later time such as when a bar code reading terminal operator might be discussing difficult read conditions during a meeting with a supervisor, manager, or representative of a bar code reading terminal manufacturer, distributor, or sales office. It is understood that while typically decoding is performed on the bar code reading terminal itself, the local playback application can apply equally to difficult read conditions, such as where a bar code reading terminal sends one or more frames to a remote server for remote decoding.

Figure 2A:
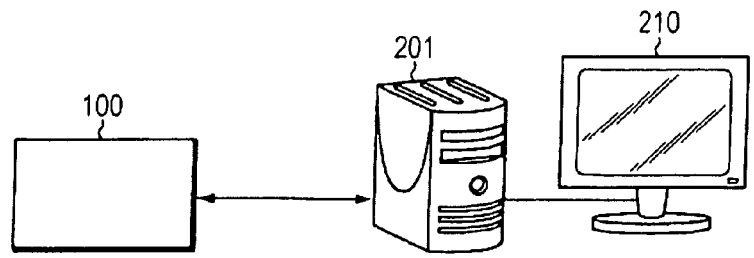
FIG. 2A shows a bar code reading terminal connected to a server.
Figure 2B:
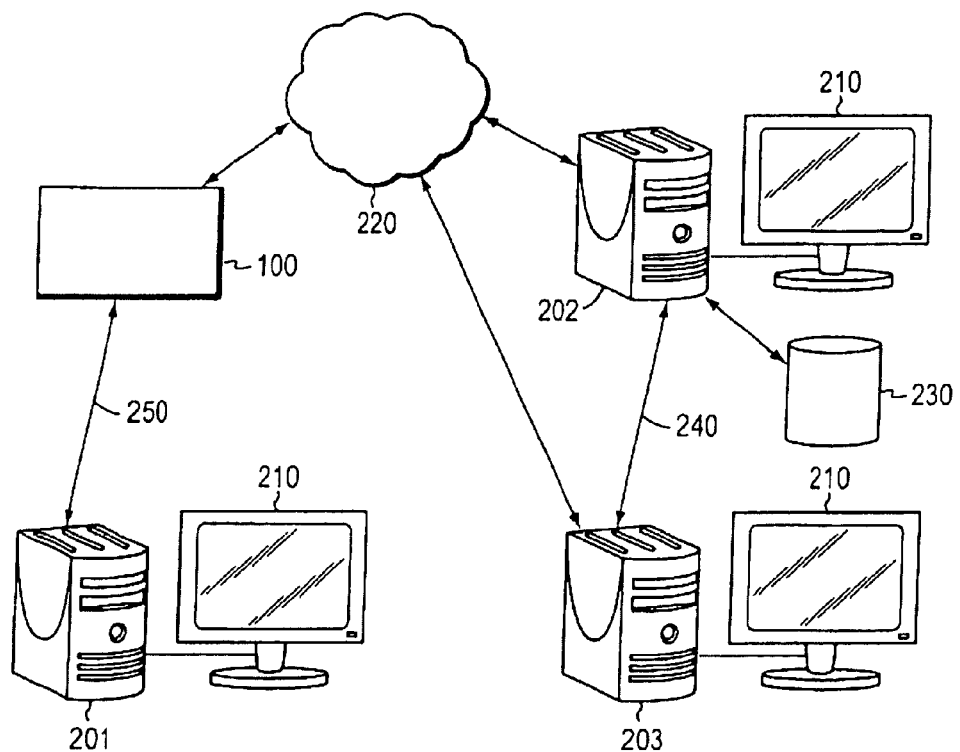
FIG. 2B shows a bar code reading terminal connected to a computer network.
Figure 2C:
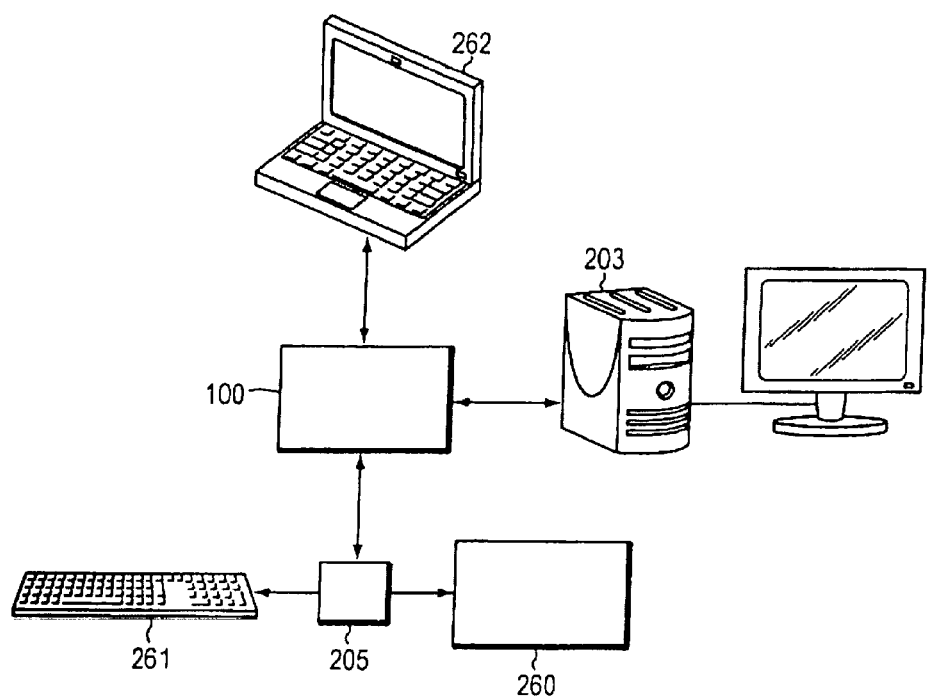
FIG. 2C shows a bar code reading terminal using a keyboard wedge and a having a second data connection for a server.

Various bar code reading terminal systems suitable for use in reviewing one or more frames related to a difficult read condition are shown in FIG. 2A, FIG. 2B, and FIG. 2C. These system configurations are merely examples representative of systems suitable for practicing the invention. As shown in FIG. 2A, bar code reading terminal 100 can be connected to a server 201. Server 201 can include a display 210. In the embodiment shown in FIG. 2A, bar code reading terminal 100 can store one or more frames locally in memory onboard bar code reading terminal 100 and then transfer one or more frames that were the subject of a difficult read condition to server 201. Bar code reading terminal 100 can send frames related to a difficult read condition to server 201, one or more frames at a time, or bar code reading terminal 100 can store locally a plurality of frames to send as a group of frames at a later time. Server 201 can be used by an operator of the bar code reading terminal and/or another person to view the one or more frames related to the difficult read condition immediately after the difficult read condition, or at some later time.

FIG. 2B shows a bar code reading terminal 100 connected to a remote server 202 via a wired or wireless network. A server 202 can also serve as a central database designated to receive frames related to difficult read conditions. Network 220 can be a local area network (LAN) (e.g., a retail store network), or a wide area network (WAN) (e.g., an enterprise intranet, or the Internet). In FIG. 2B, bar code reading terminal 100 can transmit one or more frames related to a difficult read condition to remote server 202 via network 220. Bar code reading terminal 100 can transmit the one or more frames individually, or as a group of frames. The frames received by remote server 202, and typically stored in a memory 230 connected to remote server 202 can then be viewed by a person typically on a display 210 connected to the remote server 202. Alternatively, the one or more frames can be viewed on another network computer connected to remote server 202 via a network connection 240, and viewed on a display 210 connected to network computer 203. Although not necessary, bar code reading terminal 100 can also, and simultaneously, be connected to a local server 201 either by a wired 250 or wireless (not shown) connection.

FIG. 2C shows a system using a basic bar code reading terminal model, or a system also suitable for a use with some legacy bar code reading terminals. The bar code reading terminal 100 can be connected to the system via a keyboard wedge 205 disposed between a local keyboard 261 and a local server 260. Decoded bar code indicia can be transferred from bar code reading terminal 100 to local server 260 by emulating keyboard keystrokes. Since a keyboard wedge 205 is less suitable for transmitting a frame, alternate connections can be used in such an installation to practice the inventive method. For example, where bar code reading terminal 100 might be a bar code scanner at a check out position and local server 260 a computer based cash register, a portable server 262 can be physically brought to the check out position to download one or more frames related to one or more difficult read conditions that occurred during a shift, during a day, or related to a specific problematic bar code reading terminal operation. Such a local connection between bar code reading terminal 100 and portable server 262 can be by serial connection (e.g., RS-232) or by a Universal Serial Bus (USB) connection, or other high speed bus connection such as Firewire. Alternatively, or additionally, bar code reading terminal 100 can be connected by a wired or wireless connection, to a network connected server 203. An installation as shown in FIG. 2C can be particularly well suited to large commercial sales operations using tens of basic model or legacy bar code reading terminals in a store setting at each check out or sales location.

Figure 3:
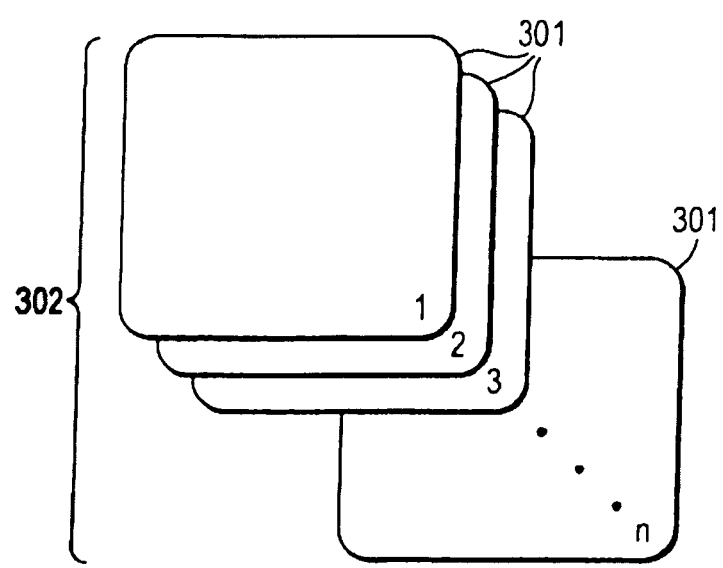
FIG. 3 shows a set of n frames.

FIG. 3 shows a symbolic diagram representing a plurality of frames 301. Frame 1 to frame n can be viewed as a plurality of frames 302. Each plurality of frames 302 can typically be related to a bar code reading situation such as a difficult read condition.

Figure 4:
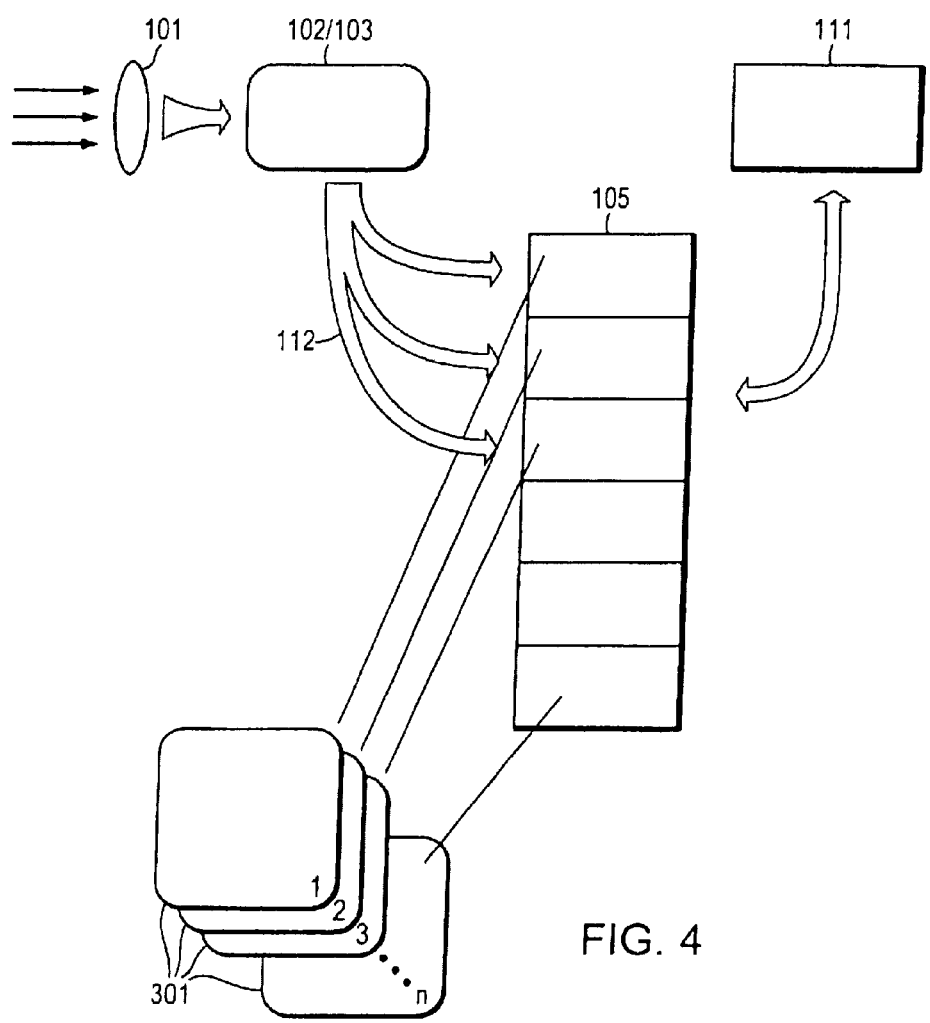
FIG. 4 shows an exemplary symbolic diagram of a bar code reading terminal that can store multiple frames.

One memory scheme for storing one or more frames of images of a bar code as shown in FIG. 3 is now discussed in more detail. Each time a bar code image is created by acquisition circuit 103, the image data can be stored into memory 105 (FIG. 1). In most cases, the number of frames continuously saved can be limited to a maximum number (m) to avoid an over filling of the available frame memory space. FIG. 4 shows an exemplary symbolic diagram of a bar code reading terminal that can store multiple frames 301. In FIG. 4, the electronic circuit performing the function of acquisition circuit 103 is shown as combined with a two-dimensional image sensor 102. Frame 301 data can be transferred directly into segments of memory in memory 105, typically through DMA transfers. While not shown in FIG. 4, control circuit 104 (FIG. 1) can then read a frame 301 from memory 105 to attempt to identify a bar code within frame 301. If a bar code is identified in frame 301, control circuit 104 can attempt to decode it. Frames can be stored in memory segments of memory 105 sequentially in time. The number of frames that can be stored is unimportant and limited only by the size of memory 105. New images, as frames 301, can be acquired and stored at any rate. For example, some bar code reading terminals can stream image data into memory 105 at a rate of 60 frames per second. Any suitable memory technology can be used. When an algorithm running on CPU 111 in control circuit 104 determines that there is a difficult read condition, control circuit 104 can direct a transfer of one or more frames 301 saved in memory 105, to some other memory (not shown) within the bar code reading terminal, or to be transmitted by any of the techniques and system connections previously described, such as shown in FIG. 2A, FIG. 2B, and FIG. 2C. Such transfers can be in the form of a continuous transmission of a group of frames 302.

Figure 5:
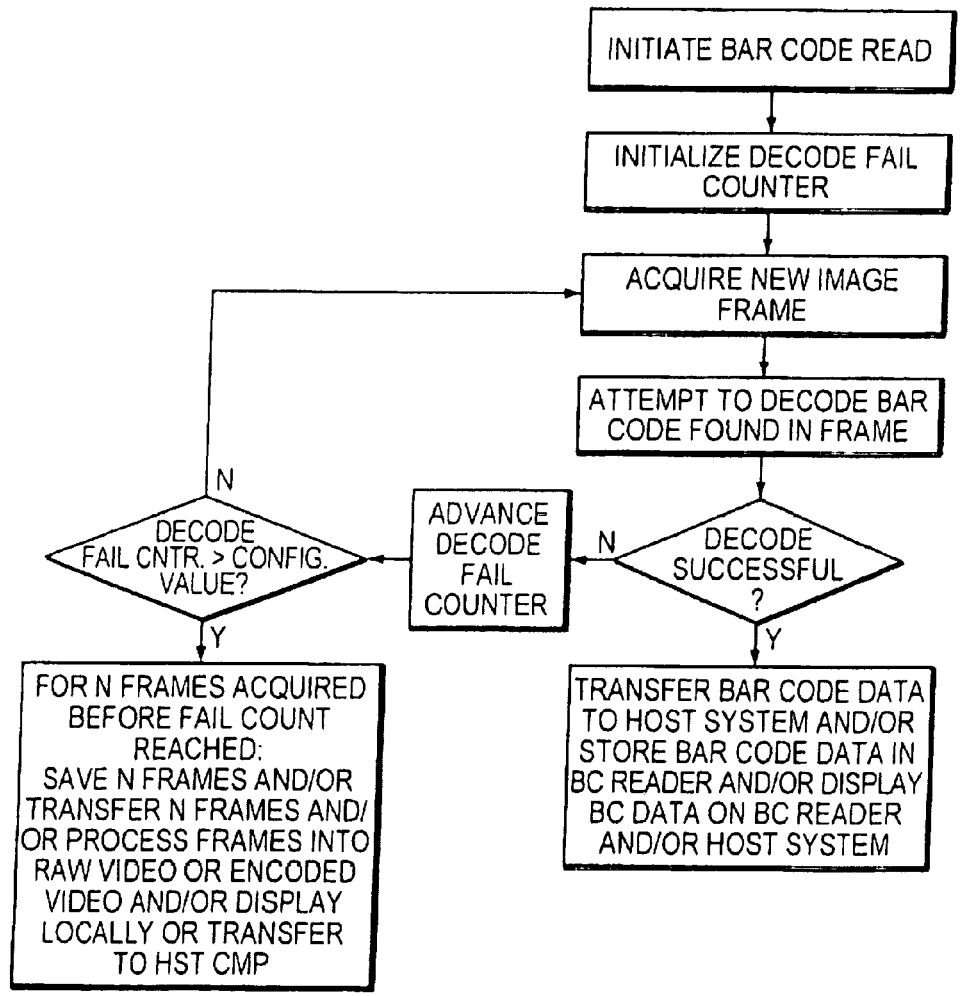
FIG. 5 shows a flow chart of an algorithm that watches for a difficult read condition.

FIG. 5 shows an exemplary flow chart of one algorithm useful for implementing the inventive method using a "watch feature" to identify a difficult read condition and then to take some action when a difficult read condition is detected. Such a watch feature can be incorporated into a bar code reading terminal application program to coordinate the handling of frames related to a difficult read condition. At the start of the flow chart at the top of FIG. 5, some event, such as a depression of manual trigger button on a hand held bar code reading terminal, causes the bar code reading terminal to image a surface and to store the image data in memory, as previously discussed. Next, a decode algorithm attempts to decode the frame. The decode process can include identifying the presence and type of bar code symbol in the frame and then attempting to decode a bar code indicia stored within the bar code symbol to extract bar code data from the bar code symbols. If the algorithm successfully decodes the bar code, the resulting bar code data can be handled in several ways. Three exemplary actions following a successful decoding of a bar code include transferring the decoded bar code data to another server system, and/or storing the decoded bar code data on the bar code reading terminal for later retrieval, and/or displaying the bar code data on a display on the bar code reading terminal.

Returning to the "decode successful?" decision block of FIG. 5, if the decode attempt failed, a decode fail counter can be incremented. A threshold value for the number of failed decode attempts can be stored in the bar code reading terminal as a numerical parameter value. The threshold value can also be part of configuration setup for the bar code reading terminal (e.g., a failed counter configuration value). As shown on the flow chart, each time the fail counter is incremented, the fail count can be compared to the fail count threshold value. If the threshold value has not been met, the bar code reading terminal can be directed to acquire another frame and to attempt to decode a bar code in each new frame. If the threshold value has been met, as the flow chart shows, the bar code reading terminal can tag or mark the memory locations of some or all of the previous frames still in memory for later reference and/or save a number (N) of frames taken before and including the most recent failure, or some combination of those frames, not necessarily including the most recent one, and/or transfer the frames, and/or process the frames into raw video or encoded video and/or display locally or transfer the frames or raw or encoded video assembled from the frames to a server.

In one embodiment, the bar code reading terminal 100 can detect a difficult read condition according to the procedure described with reference to FIG. 5, i.e., a difficult read condition is present if the terminal 100 unsuccessfully attempts to decode a threshold number of successive frames. In another embodiment, the terminal 100 can be configured so that it detects a difficult read condition by processing one or more frames, e.g., to determine whether the terminal is in motion or to determine whether a saturation condition is present.

One or more frames, typically related to a difficult read condition, can be viewed one frame at a time to ascertain what caused the difficult read condition. Another way to view the frames according to the invention is to view them in rapid succession. Viewing the images in rapid succession can give an animated view of the attempt to read a bar code.

In one embodiment, a bar code reading terminal can be constantly emptying a section of, or all of memory 105 configured as a frame buffer and only save the buffer or some portion thereof, when a difficult read condition is encountered. With a large enough memory buffer to store a large enough set of frames 302, the set of frames 302 can be used to make a viewable video. By presenting a plurality of frames 301 at a suitable presentation rate, e.g., at 25 frames per second, the frames can be viewed as frames of a moving picture or as a video. Such a video representation can be saved as or later assembled into a file in a format similar to a raw video file such as a raw file format that can be obtained using a digital video recorder. The raw video file can then be converted to one of many standard compressed video file formats that are common in the video industry including but not limited to, MJPEG format, MPEG-4 format, RealVideo format, and WMV format. The advantage of presenting a video of bar code frames related to a difficult read condition is that such a video can be very convenient for others to view and critique or analyze. When such a video is put into a standard video file format, the video can be viewed without the need of any special, dedicated, or proprietary software on virtually any type of suitable computer platform.

While most embodiments of the invention discussed so far have included the useful application of analyzing a difficult reading condition, another use for the invention is to record a successful bar code reading session. Such a recording can be made by an experienced bar code reading terminal operator and later played back for training purposes, so that new bar code reading terminal operators can be trained in good bar code reading techniques by viewing a bar code reading process directly through the bar code reading terminal imager. Such training sessions can also allow operator trainees to view difficult reading condition episodes to learn how to avoid problems related to holding the bar code reading terminal improperly (e.g., too close or at an incorrect angle) or related to undesirable movement of the bar code reading terminal while imaging a bar code.

Figure 6:
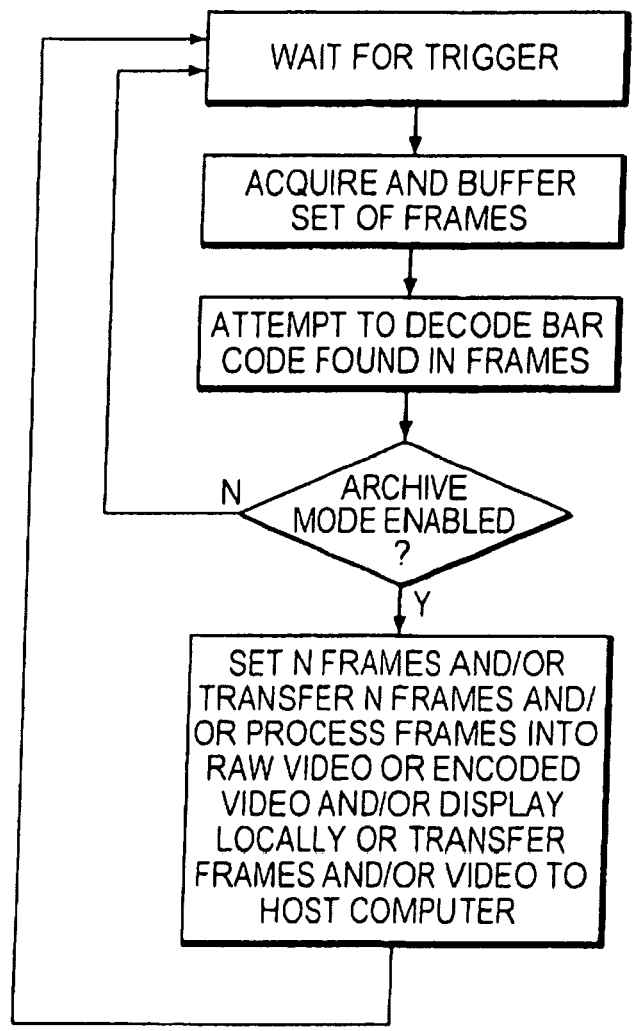
FIG. 6 shows a flow chart of algorithm for use with the archive mode.

In another embodiment, a bar code reading terminal as previously discussed can be configured to operate in an archiving mode. FIG. 6 shows an exemplary flow chart of one algorithm useful for implementing the inventive method using such an archiving mode. For example, in response to receipt of a trigger or trigger signal, a bar code reading terminal can buffer a set of frames and subject each frame to a decode attempt. In an archive mode, the bar code reading terminal can then transfer some or all of the frames subjected to a decode attempt to another location for later viewing or convert some or all of the frames subjected to a decode attempt into a video file. The bar code reading terminal can also be configured so as to allow a user to activate or deactivate the archiving mode. Alternatively, or in addition to a manual configuration feature, a bar code reading terminal can also include a user interface. A bar code reading terminal having a user interface can also be configured to accept a user initiated control signal or a control signal from an external computer to activate or deactivate the archiving mode. The control signal can be received by a suitable wired or wireless interface. As shown in FIG. 5, but not shown in FIG. 6, it is also understood that any bar code data obtained from a bar code found in one or more of the set of frames, can be saved in the bar code terminal, displayed on a bar code terminal display, and/or transferred to a server via a wired or wireless connection. Such a server can be located in the physical vicinity of the bar code reading terminal or remotely located.

The terminal's video capturing functionality can also be useful in a situation where it is not possible for the video data consumer to be local to the data source at the time of the data collection, e.g., a retail store staff member can set up a display and send a video recording to the manager for approval, or an on-site maintenance crew member can capture the video of a faulty piece of equipment and send it to the engineering team, etc. A bar code reading terminal can store a sequence of images captured by the 2D imager, convert it to a compressed video format, and transmit the resulting compressed video file or video stream to a remote playback device via an ad-hoc wireless network, and/or a LAN, and/or a WAN, directly or via a content serving server.

Figure 7:
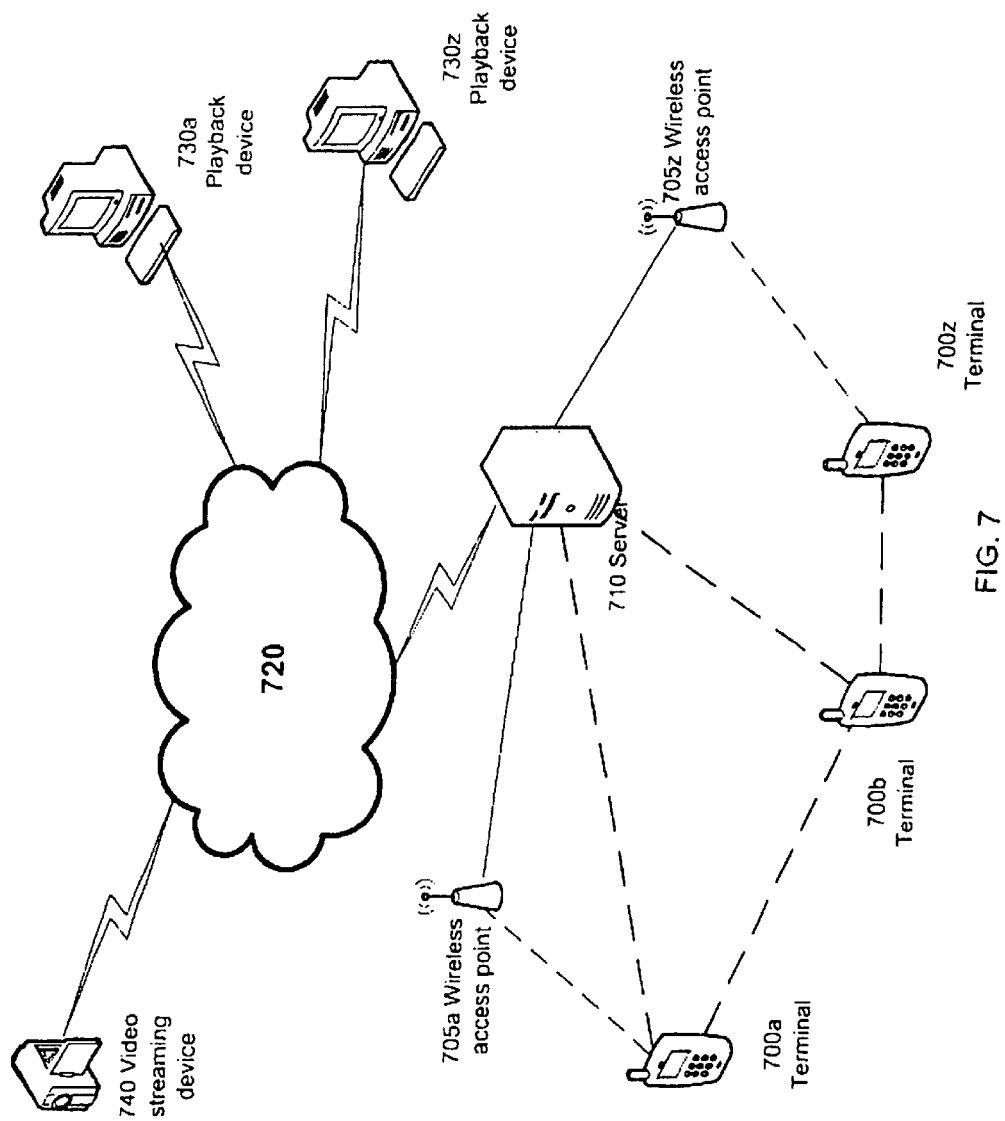
FIG. 7 shows a network view of a bar code reading terminal transmitting a compressed video file or video stream to one or more playback devices, such as personal computers via a content serving server.

FIG. 7 shows a network view of one embodiment of a bar code reading terminal transmitting a compressed video file or video stream to one or more playback devices, such as personal computers, via a content serving server. The operator of the video transmission originating terminal 700a points the imager lens towards the object to be video recorded, and starts the video recording mode. The video information is captured by the terminal and can be converted in real time into one of the standard or proprietary video formats, e.g., MJPEG, MPEG-4, RealVideo, or WMV format.

The originating terminal 700a can also perform audio recording (e.g., the operator's voice) contemporaneously with the video recording, and the audio recording in the same compressed file with the video recording, or in a separate compressed audio file.

The resulting compressed video file or formatted video stream can be uploaded by the originating terminal 700a to a server 710, and then can be downloaded by, or streamed to, one or more playback devices 730a-730z, or can be streamed by the originating terminal 700a to one or more playback devices 730a-730z in real time. A playback device 730 can be, e.g., a personal computer, a personal communication device such as a personal digital assistant (PDA), or a bar code reading terminal equipped with an onboard display. The originating terminal 700a can communicate with the server 710 directly, or via one of the wireless access points 705a-705z, or using ad-hoc (mesh) connectivity with other bar code reading terminals 700b-700z. The mesh interconnectivity of the terminals 700 can be implemented, e.g., based on Dynamic Source Routing (DSR) protocol, which is a routing protocol designed specifically for use in multi-hop wireless ad hoc networks of mobile devices.

In one embodiment, the server 710 can act as a file server, where the originating bar code reading terminal 700*a* can upload the compressed video file upon receiving a user interface command, e.g., a dedicated button or a menu item selection, optionally preceded by input or selection by the user of the Domain Name System (DNS) name or IP address of the server 710, and/or the name of the directory where the file should be placed. The user interface can also provide the means for the user to enter a textual description of the compressed video file. The compressed video file can then be accessed asynchronously by one or more the playback devices 730*a*-730*z*, e.g., when the user of a playback device 730 starts an HTML browser and enters the IP address or DNS name of the server 710, and then selects the file to be viewed. The embodiment having a file server is useful when the video information recorded does not need to be viewed by the users of the playback devices 730*a*-730*z* contemporaneously with the events recorded.

In accordance with the embodiment having a file server, the originating terminal 700*a* can capture the video information and convert it into one of the standard or proprietary video formats, e.g., MJPEG, MPEG-4, RealVideo, or WMV format. Then, the originating terminal 700*a* can upload the resulting compressed video file to the server 710 via wireless or wired (e.g. via a docking station) connectivity, using any suitable file transfer protocol, e.g., File Transfer Protocol (FTP) or Hyper Text Transfer Protocol (HTTP). Upon receiving the compressed video file, the server 710 can store the file in its file system, and make it accessible to the playback devices 730*a*-730*z*. The playback devices 730*a*-730*z* can access the server 710 via network 720 which can be a LAN (e.g., a retail store network), or a WAN (e.g., an enterprise intranet, or the Internet).

The server 710 can make the compressed video file downloadable by the playback devices 730*a*-730*z*, e.g., via FTP and/or HTTP protocol, by running the appropriate server software program (e.g., Apache HTTP server from Apache Software Foundation), and placing the video file in a directory accessible by the clients of the server software program (e.g., FTP or HTTP clients). In the HTTP server-based embodiment, additional steps of creating or editing HTML pages and/or server-side and/or client-side scripts can be required, and one or more hypertext links to the video file, optionally accompanied by a textual description of the video file, can be placed into the HTML pages served by the server 710.

Each of the playback devices 730*a*-730*z* can run a software client program (e.g., an FTP client, or an HTML browser) which is capable of downloading the video file from the server 710. Each of the playback devices 730*a*-730*z* can also run a software component for video playback, compatible with the format of the video files downloaded from the server 710, e.g., MPEG-4 player, RealMedia player, or Windows Media player.

In accordance with one variant of the embodiment having a file server, each of the playback devices 730*a*-730*z* can perform progressive download of the video file, by starting the playback operation upon the downloading, or buffering, of a portion of the video file of a pre-determined size, but before the full completion of the file download operation. Employing progressive download provides for better end user experience by reducing the user wait time between the start of the download operation and the start of playback operation, and is capable of being implemented over a limited network bandwidth insufficient for real-time video streaming.

In accordance with another variant of the embodiment having a file server, the server 710 can act as a video streaming server, so that a real-time video stream would be delivered to the playback devices 730*a*-730*z*. Real-time video streaming, while usually requiring more network bandwidth than video download or progressive download, typically has numerous advantages, including, e.g., further improving the end user experience (e.g., by providing playback control capabilities, such as pause, fast forward, rewind, and skip a track), optimizing the network bandwidth usage since only the parts of the video files which are actually watched by the user of the playback device 730*a*-730*z* need to be transferred, and allowing the video provider to monitor exactly which video files and/or parts of video files were played by every playback device 730*a*-730*z*. The server 710 can perform real-time video streaming by running an appropriate server software component, e.g., a Real Time Streaming Protocol (RTSP) server.

RTSP is a protocol for use in streaming media systems which allows a user of a playback device to issue playback control commands such as pause, fast forward, rewind, and skip a track. An RTSP server can use Real Time Transport Protocol (RTP) as the transport protocol for the delivery of the video content. RTP typically operates over User Datagram Protocol (UDP). UDP is better suited for real-time video streaming than Transmission Control Protocol (TCP) which is the transport protocol used by HTTP, since UDP does not guarantee delivery of each packet of data, and thus does not introduce delays caused by packet retransmissions.

In a variant of the embodiment having a file server, the server 710 can simultaneously transmit the compressed video file to a plurality of playback devices 730 using, e.g., Internet Protocol (IP) multicasting, to a multicast IP address specified by the operator of the server 710 via an appropriate user interface.

In another embodiment, bar code reading terminal 700*a* can act as a playback device, to play back the video stream received from the video stream originating device 740. The embodiment having a terminal acting as a playback device can be useful in a situation when the operator of terminal 700*a* needs to access video information from a remote source, e.g., an engineering staff member showing the operator how to handle a specific equipment problem. In a variant of the embodiment having a terminal acting as a playback device, a two-way video and audio (e.g., voice) communication can be established between terminal 700*a* and remote device 740. The embodiment providing two-way video and audio communication can be useful, e.g., where the operator of terminal 700*a* is located at a customer's site, and a remotely located supervisor needs to communicate to the customer.

Figure 8:
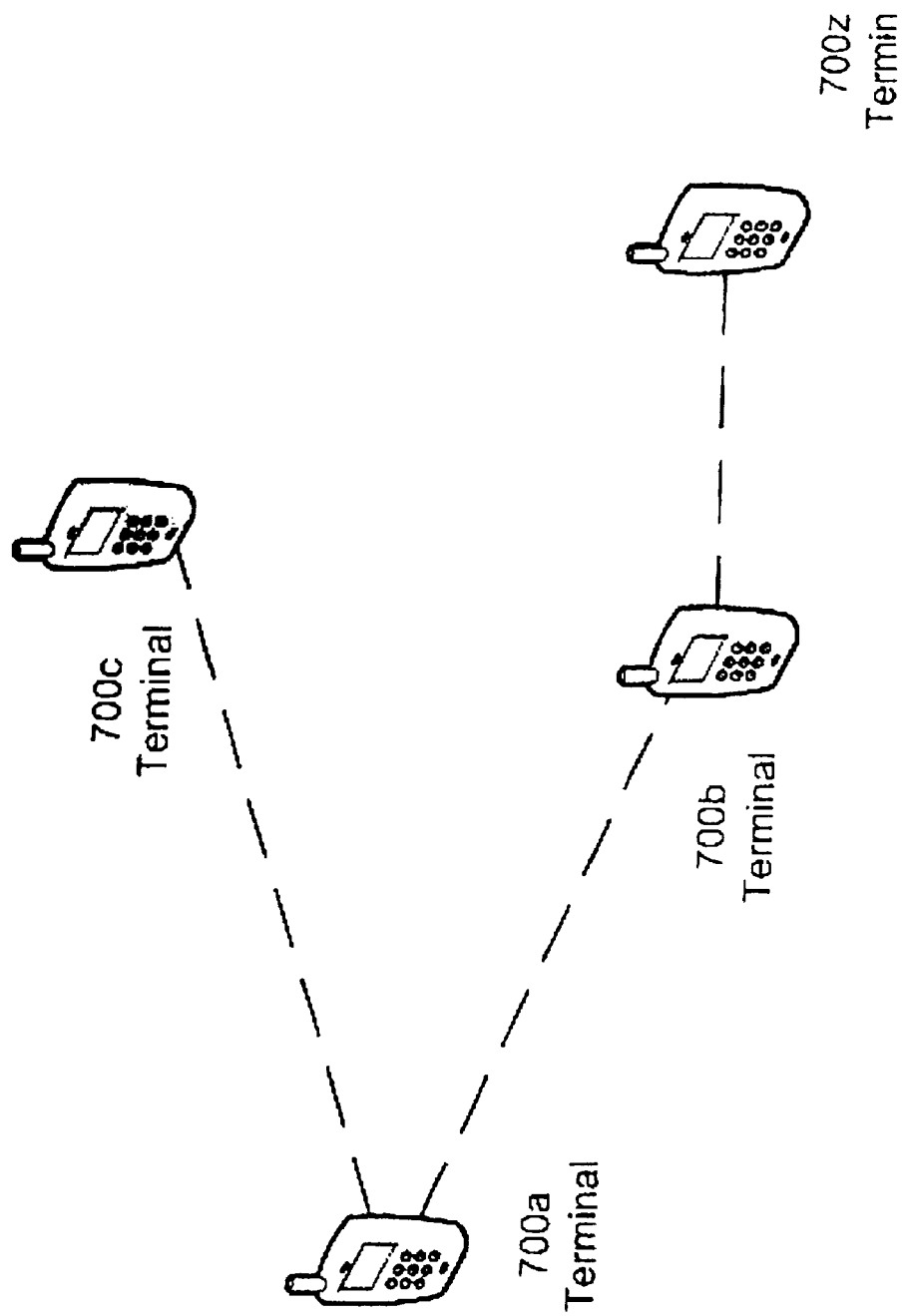
FIG. 8 shows a network view of another embodiment wherein a terminal operator can send the real-time video stream captured by the terminal to one or more operators of peer terminals.

FIG. 8 shows a network view of another embodiment wherein a terminal operator can send the real-time video stream captured by the terminal to one or more operators of peer terminals. The embodiment depicted in FIG. 8 can be useful, e.g., for a maintenance crew member working at a limited accessibility position (e.g., a utility pole) who needs to consult or coordinate his actions with one or more peer maintenance crew members working in the physical proximity.

In accordance with the embodiment depicted in FIG. 8, a maintenance crew member operating the terminal 700*a* can invoke a user interface which presents a list of symbolic strings describing the currently active peer terminals. A symbolic string describing a terminal can be, e.g., the name of the person operating it, or the operator's business function, e.g., "maintenance crew supervisor." In one embodiment, a symbolic string describing a terminal 700 can be entered manually by the terminal operator via a user interface. In another embodiment, a centralized database can be queried by the terminal displaying a list of peer terminals, in order to extract, for every peer terminal, the operator's name, and/or job title, and/or other textual information. In one embodiment, the centralized database can correlate, for every terminal 700, the terminal's unique identifier (e.g., the serial number of the terminal, or the Media Access Control (MAC) address of the terminal's network interface), with a database table linking operators' names and terminal IDs, and with another database table linking operators' names and their job titles, etc.

In one embodiment, a symbolic string describing a peer terminal can include the quality of the wireless link between the data originating terminal 700*a* and the peer terminal, measured, e.g., as the radio signal strength. In many situations, the wireless link quality is correlated to the physical distance between two peer terminals, and thus can be used by the operator of the data originating terminal 700*a* for selecting peer terminals physically nearest to the terminal 700*a*. Correlating physical distance between peer terminals and the wireless link quality can be advantageous, e.g., when the operator of the data originating terminal 700*a* who wishes to obtain help in diagnosing/repairing a faulty piece of equipment, selects one or more peer terminals physically nearest to the data originating terminal, transmits the video stream showing the symptoms of the failure, and then asks one or more of the operators of peer terminals who is able and willing to help in the diagnostics or repair, to come to the location in question.

In one embodiment, the operator of the originating terminal 700*a* can use the user interface to select one or more terminals to send the video stream to, and to start the video recording and video streaming mode. Upon receiving the user interface selections of the peer terminals to send the video stream to, the originating terminal 700*a* can send a message to the peer terminals selected by the operator containing at least one or more of the transmission parameters to be used for the video streaming.

The transmission parameters can include the multicast IP address to be used for the video streaming or the IP address of the originating terminal.

Beside the transmission parameters, the message can optionally include a text message to the operator of a peer terminal. Upon receiving the message, peer terminal 700*b* can attract the operator's attention (e.g., by emitting an audible signal) and start receiving the transmission, (e.g., by subscribing to the multicast at the specified multicast IP address, or by sending RTSP commands to establish an RTSP session with the originating terminal identified by its IP address) while simultaneously rendering the video stream on the onboard display.

Both operators of originating and receiving terminals can have a user interface option to exit the transmitting and receiving mode, correspondingly.

In one variant of the embodiment depicted in FIG. 8, the data originating bar code reading terminal 700*a* can communicate with peer bar code reading terminals outside of its immediate wireless communication range, e.g., by using ad-hoc (mesh) connectivity with other bar code reading terminals 700*b*-700*z*, which can be implemented, e.g., based on DSR protocol.

Figure 9:
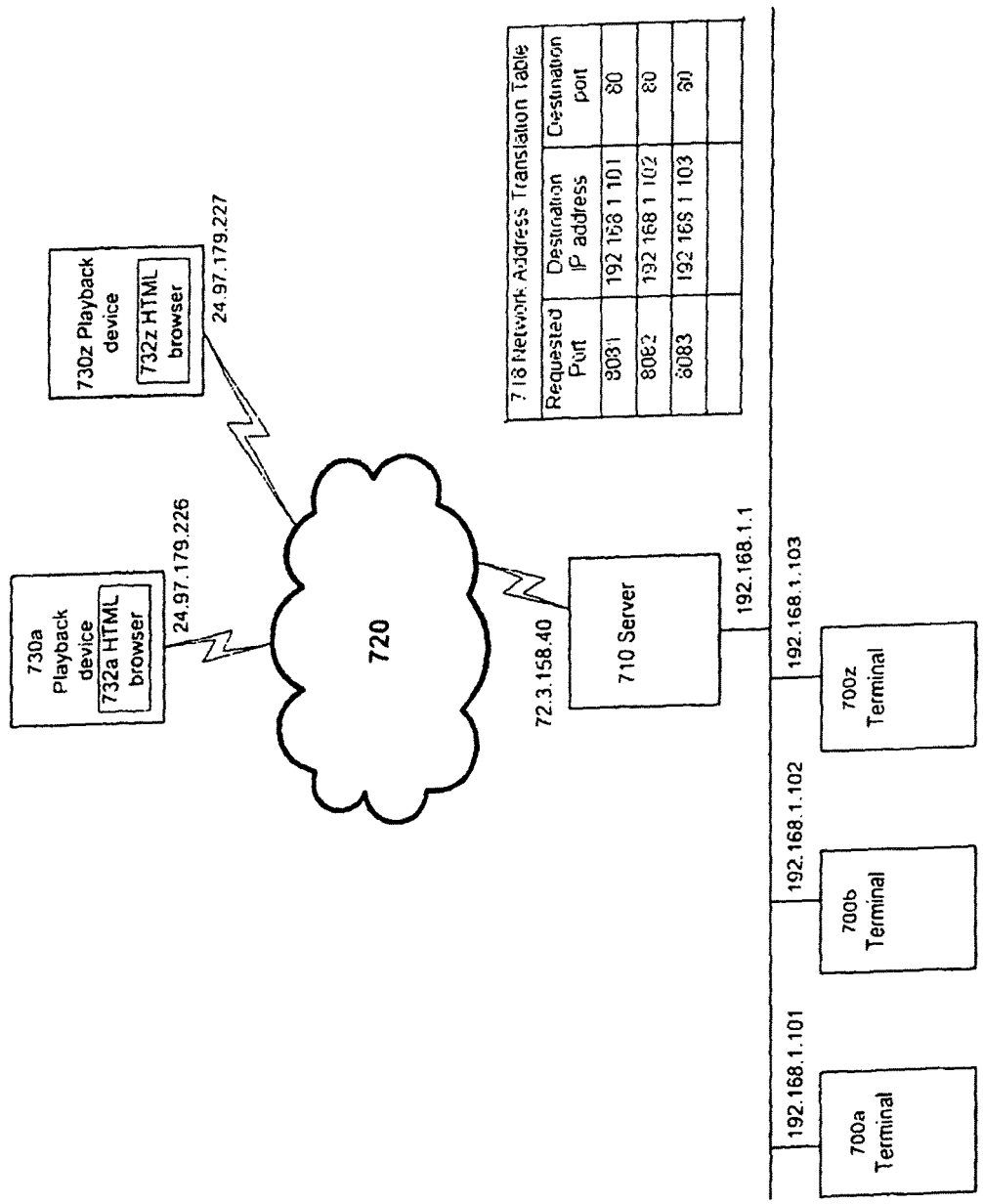
FIG. 9 shows a network view of a bar code reading terminal transmitting a compressed video file or video stream to one or more playback devices, such as personal computers, via a router.

FIG. 9 shows a network view of another embodiment, wherein the content serving software component (e.g., FTP server, HTTP server, or RTSP server) can be executed by the originating bar code reading terminal 700*a*, rather than by the server 710. The operator of the originating bar code reading terminal 700*a* can enter the name of the compressed video file and optional textual description of the file, and then start the recording. The compressed video file can be accessed by one or more the playback devices 730*a*-730*z*, e.g., when the user of a playback device 730 starts an HTML browser and enters the IP address or DNS name of the server 710, and then selects the file to be viewed. A variant of the embodiment depicted in FIG. 9 employing real-time streaming delivery of the compressed video file (e.g., using RTSP protocol) can be useful when the video information recorded needs to be viewed by the users of the playback devices 730*a*-730*z* contemporaneously with the events recorded.

In accordance with the embodiment shown in FIG. 9, server 710 can act as a router forwarding the data packets between the originating terminal 700*a* and the playback devices 730*a*-730*z*. A skilled artisan would appreciate the fact that other routers (not shown in FIG. 9) can be needed to route data packets between the originating terminal 700*a* and the playback devices 730*a*-730*z*. The server 710 can also run a Dynamic Host Configuration Protocol (DHCP) server software component which dynamically assigns IP addresses to the bar code reading terminals 700*a*-700*z*. The server 710 can also run a Network Address Translation (NAT) software component which provides the IP connectivity from playback devices 730*a*-730*z* to the originating terminals 700*a*-700*z* where the latter have non-routable IP addresses, e.g., from 192.168.x.y range. An example of network address translation performed by NAT software component is shown in the Network Address Translation Table 718. A user of the playback device 730*a* wishing to send a file transfer request to the terminal 700*a* can enter in the URL input line of the browser the name of the file to be retrieved preceded by the IP address of the external network interface of the server 710 or by a DNS name corresponding to that IP address, i.e., 72.3.158.40, and port 8081. The NAT software component running on the server 710 can intercept the data packet, look up the requested port number in the Network Address Translation Table 718, substitute the destination IP address and destination port found in the table for the original IP address/port pair, and forward the data packet to the destination IP address.

In a variant of the embodiment depicted in FIG. 9, the originating terminal 700 can simultaneously transmit the compressed video file to a plurality of playback devices 730 using, e.g., Internet Protocol (IP) multicasting, upon receiving a user interface command, e.g., a dedicated button or a menu item selection, preceded by input or selection by the user of the multicast IP address to be used. The user interface can also provide the means for the user to enter a textual description of the compressed video file.

Figure 10:
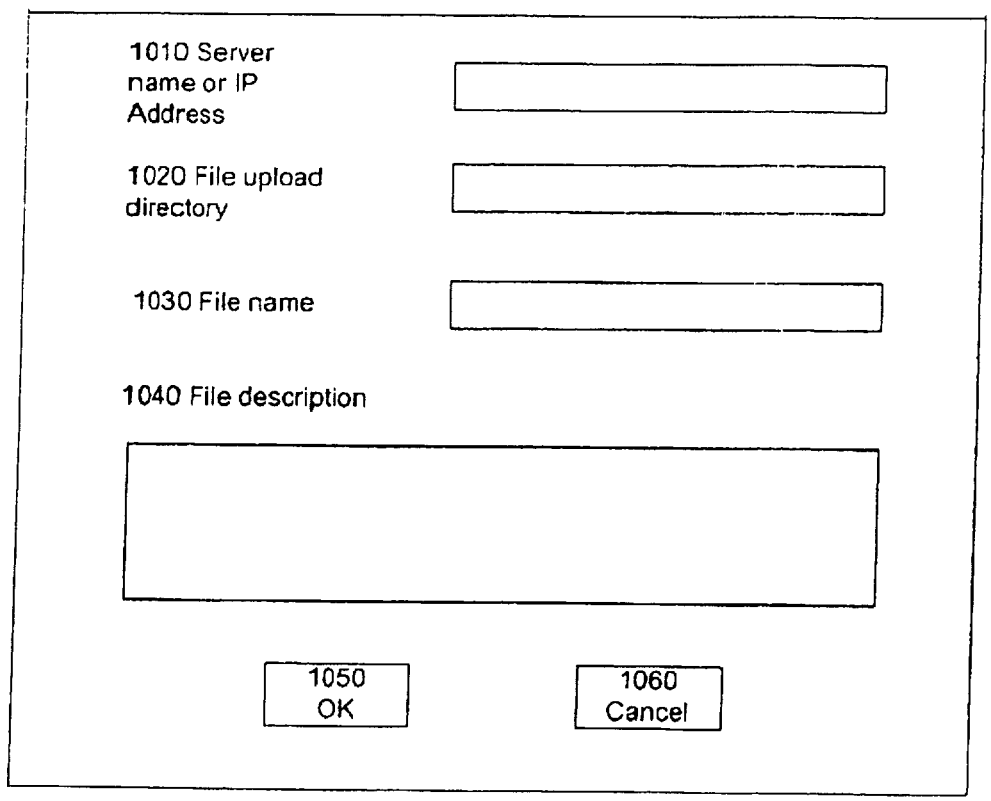
FIG. 10 shows an example of the graphical user interface allowing an operator of a bar code reading terminal, in accordance with the embodiment shown in FIG. 7, to specify the file server and compressed video file or video stream parameters, and initiate the upload operation.

FIG. 10 shows an example of the graphical user interface allowing an operator of a bar code reading terminal, in accordance with the embodiment shown in FIG. 7, to specify the file server and compressed video file or video stream parameters, and initiate the file upload operation. Input field 1010 allows the operator to specify the DNS name or the IP address of the file server 710 of FIG. 9. Input field 1020 accepts the operator's input of the directory name to which the compressed video file should be uploaded. Input field 1030 allows the operator to specify the compressed video file name. Input field 1040 allows the operator to enter a textual description of the compressed video file. Upon entering the information into the above input fields, the operator can initiate the file upload to the server by clicking OK button 1050, or cancel the operation by clicking Cancel button 1060.

Figure 11:
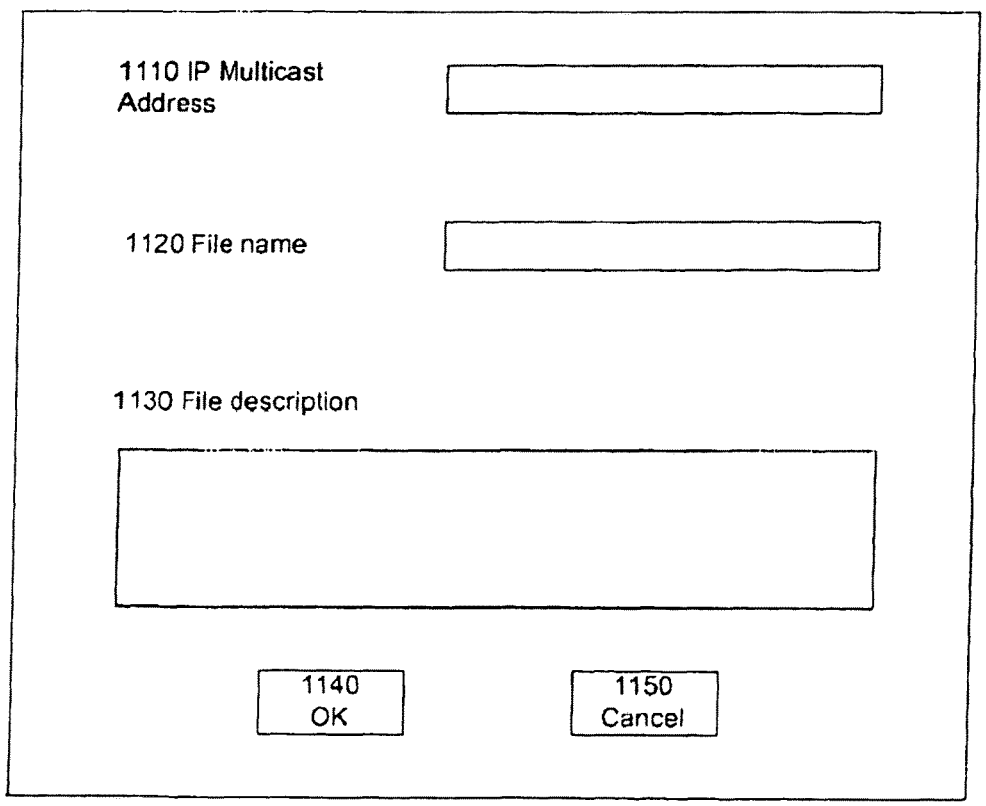
FIG. 11 shows an example of the graphical user interface allowing an operator of a bar code reading terminal, in accordance with the embodiment shown in FIG. 9, to specify the compressed video file or video stream parameters and a multicast IP address, and initiate the multicasting.

FIG. 11 shows an example of the graphical user interface allowing an operator of a bar code reading terminal, in accordance with the embodiment shown in FIG. 9, to specify the compressed video file or video stream parameters and a multicast IP address, and initiate the multicasting. Input field 1110 allows the operator to specify the multicast IP address to transmit the compressed video file or video stream to. Input field 1120 accepts the operator's input of the name of the compressed video file or video stream. Input field 1130 allows the operator to enter a textual description of the compressed video file. Upon entering the information into the above input fields, the operator can initiate the multicast by clicking OK button 1140, or cancel the operation by clicking Cancel button 1150.

FIG. 12 shows an example of the graphical user interface allowing an operator of a bar code reading terminal, in accordance with the embodiment shown in FIG. 8, to select from a list of symbolic strings describing active peer terminals, one or more terminals to send the video stream to. In the data input area 1210, the operator is presented with a table containing symbolic strings describing active peer terminals, link quality, and a check box the operator needs to check in order to include the corresponding peer terminal into the list of terminals where the video transmission will be sent. Input field 1220 accepts the operator's input of an optional text message to be sent to the operators of the peer terminals selected in the input area 1210. Upon entering the information into the above input fields, the operator can start the video recording and video streaming mode by clicking OK button 1230, or cancel the operation by clicking Cancel button 1240.

Figure 13:
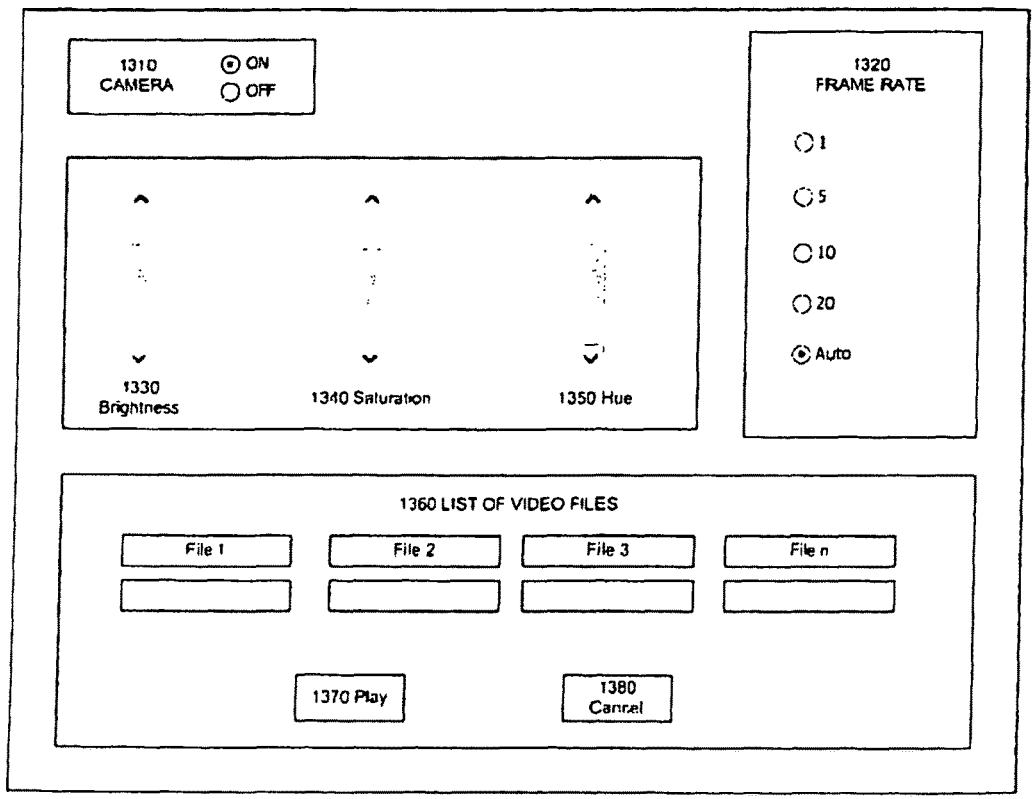
FIG. 13 shows an example of the graphical user interface allowing an operator of a playback device to remotely control the video capturing and video streaming operations of a bar code reading terminal.

FIG. 13 shows an example of the graphical user interface allowing an operator of a playback device 730 of FIG. 9 to remotely control the video capturing and video streaming operations of a bar code reading terminal 700 of FIG. 9. The video stream originating terminal 700 of FIG. 9 can run an HTTP server software component, and playback device 730 of FIG. 9 can run an HTML browser, so that the graphical user interface can be implemented, e.g., as one or more HTML pages with data input fields and other controls.

Playback device 730 of FIG. 9 can be, e.g., a personal computer, a personal communication device such as a personal digital assistant (PDA), or a bar code reading terminal equipped with an onboard display.

Playback device 730 of FIG. 9 can access the video stream originating terminal 700 over a wireless link or over a LAN or a WAN. Data packets can be sent by the video stream originating terminal 700 of FIG. 9 directly to the playback device 730 of FIG. 9. Alternatively, server 710 of FIG. 9 can act as a router forwarding data packets between the originating terminal 700 of FIG. 9 and the playback device 730 of FIG. 9. A skilled artisan would appreciate the fact that other routers (not shown in FIG. 9) can be needed to route data packets between the originating terminal 700 of FIG. 9 and the playback device 730 of FIG. 9.

In accordance with the remote control embodiment, an operator of playback device 730 can start an HTML browser and enter the IP address or DNS name of the video stream originating terminal 700. Upon receiving an HTTP request from a playback device 730, the HTTP server software component running on the video stream originating terminal 700 can serve an HTML page shown in FIG. 13.

Radio button 1310 allows the user to switch on or off the camera of the video stream originating terminal 700. Switching the camera on can also start the real-time transmission of the video stream being recorded by the video stream originating terminal 700 to the playback device 730.

Slide bars 1330, 1340, and 1350 allow the user to adjust the values brightness, saturation, and hue, respectively.

Radio button 1320 allows the user to select the frame rate.

A skilled artisan would appreciate the fact that the graphical user interface can include controls for adjusting other parameters related to the operation of the video stream originating terminal 700.

The graphical user interface can also allow the operator of a playback device 730 to select a previously recorded file from the list of files 1360, and initiate the playback by clicking the Play button 1370.

It should also be noted that some embodiments of a bar code reading terminal as previously discussed can be devoid of a keyboard and display. Such embodiments devoid of a keyboard and display can generally accomplish the various inventive functions, including transferring frames subject to decode attempts or videos generated from frames subject to decode attempts by working with one or more local or remote server systems.

While the present invention has been described in application to bar code reading terminals, it will be understood by one skilled in the art that aspects of the present invention can be used in other data collection systems and apparatuses, in particular, imaging systems and apparatuses, including but not limited to document readers.

A small sample of systems methods and apparatus that are described herein is as follows:

A1. A bar code reading terminal comprising:
   a two-dimensional image sensor;
   a lens assembly focusing an image onto said two-dimensional image sensor;
   wherein said bar code reading terminal in response to receiving a trigger signal captures a set of frames, buffers said set of frames into a buffer memory, reads each frame one at a time from said buffer memory and subjects each of said set of frames to a decode attempt; and
   wherein said bar code reading terminal in response to a difficult read condition being detected transfers at least a subset of frames of said set of frames that have been subject to a decode attempt to another location for later viewing.

A2. The bar code reading terminal of claim A1, wherein said at least a subset of frames is transferred to a second memory within said bar code reading terminal.

A3. The bar code reading terminal of claim A1, wherein said at least a subset of frames is transferred to a server.

A4. The bar code reading terminal of claim A1, wherein said bar code reading terminal converts said at least a subset of frames to a raw video file.

A5. The bar code reading terminal of claim A4, wherein said bar code reading terminal further encodes said raw video file into a compressed video file format.

A6. The bar code reading terminal of claim A5, wherein said compressed video file format is one of MJPEG format, MPEG-4 format, RealVideo format, WMV format.

A7. The bar code reading terminal of claim A3, wherein said server converts said at least a subset of frames to a raw video file and transfers said raw video file to said server.

A8. The bar code reading terminal of claim A7, wherein said server further encodes said raw video file into a compressed video file format.

A9. The bar code reading terminal of claim A8, wherein said compressed video file format is one of MJPEG format, MPEG-4 format, RealVideo format, WMV format.

B1. A system for recording difficult read conditions comprising:

a computer network;

a server having a memory, said server connected to said network, said server serving as a central database of difficult read conditions; and at least one bar code reading terminal, said bar code reading terminal connected to said network and said bar code reading terminal including a 2D image sensor and said bar code reading terminal configured to locate and decode a bar code symbol in images acquired from said 2D image sensor and to detect a difficult read condition, wherein on detection of said difficult read condition said bar code reading terminal transfers 2D image data that was subject to decoding to said server.

B2. The system of claim B1, wherein said 2D image data comprises a plurality of frames of 2D image data.

B3. The system of claim B2, wherein said plurality of frames of 2D image data are transferred as a raw video file.

B4. The system of claim B3, wherein said plurality of frames of 2D image data are transferred as an encoded video file in a compressed file format.

B5. The system of claim B2, wherein said plurality of frames of 2D image data is converted into a raw video file by said server.

B6. The system of claim B5, wherein said plurality of frames of 2D image data is encoded into a compressed video file format by said server.

C1. A method to train bar code reading terminal operators comprising the steps of:

providing a bar code reading terminal;

providing a bar code to be read by said bar code reading terminal;

imaging said bar code using said bar code reading terminal;

storing a plurality of said images into a buffer memory;

recalling each of said images one at a time from said buffer memory;

attempting to decode each image to extract a bar code data;

determining if said attempt to extract said bar code data was successful;

transferring at least a subset of said plurality of said images subjected to decoding for later viewing, if the step of attempting to decode was unsuccessful; and viewing said plurality of images to evaluate an imaging technique employed by an operator of said bar code reading terminal.

C2. The method of claim C1, wherein the step of transferring at least a subset of said plurality of said images comprises the step of transferring at least a subset of said plurality of said images subjected to decoding in a raw video format for later viewing, if the bar code decoding attempt was unsuccessful.

C3. The method of claim C2, wherein the step of transferring at least a subset of said plurality of said images comprises the step of transferring at least a subset of said plurality of said images subjected to decoding in an encoded video format for later viewing, if the bar code decoding attempt was unsuccessful.

C4. The method of claim C1, wherein the step of transferring at least a subset of said plurality of said images comprises the step of transferring at least a subset of said plurality of said images subjected to decoding for later viewing, if the bar code decoding attempt was successful for later recall and viewing to demonstrate a good imaging technique.

D1. A bar code reading terminal comprising:

a two-dimensional image sensor and an imaging assembly, wherein said terminal is configured in response to receipt of a trigger signal to buffer a set of frames and subject each frame of said set of frames to a decode attempt; and wherein said terminal is configured to operate in an archiving mode of operation in which said terminal at least one of transfers to another location for later viewing or converts into a video file format said set of frames subjected to a decode attempt.

D2. The bar code reading terminal of claim D1, wherein said terminal is configured so that a user can perform at least one action of the group consisting of: activating said archiving mode and deactivating said archiving mode.

D3. The bar code reading terminal of claim D1, wherein said terminal includes a user interface, and wherein said terminal is configured so that a user can initiate a control signal to activate said archiving mode utilizing said user interface.

D4. The bar code reading terminal of claim D1, wherein said terminal is configured so that said terminal can receive a control signal to activate said archiving mode from an external computer.

D5. The bar code reading terminal of claim D1, wherein said terminal is devoid of a keyboard and display.

E1. A bar code reading terminal operating in a system including an external server and a plurality of peer terminals, the bar code reading terminal comprising:

a two-dimensional image sensor;

a lens assembly focusing an image onto said two-dimensional image sensor;

a hand held housing incorporating said image sensor and said lens assembly;

at least one wireless communication interface;

a memory device;

wherein said external server has at least one network interface capable of establishing communications with said bar code reading terminal and at least one network interface capable of establishing communications with playback devices connected to at least one of local area network, wide area network;

wherein said bar code reading terminal is configured, in response to a first user interface command, to start storing in said memory the captured video frames;

wherein said bar code reading terminal is further configured, in response to a second user interface command, to stop storing the captured video frames; and wherein said bar code reading terminal is further configured to transform one or more of said captured video frames into a compressed video file format.

E2. The bar code reading terminal of claim E1, wherein said compressed video file format is one of MJPEG format, MPEG-4 format, RealVideo format, WMV format.

E3. The bar code reading terminal of claim E1, wherein said bar code reading terminal is further configured to perform audio recording contemporaneously with capturing said one or more video frames, and store said recorded audio in one of said compressed video file, a separate compressed audio file.

E4. The bar code reading terminal of claim E1, wherein said bar code reading terminal is further configured to transmit at least a first portion of said compressed video file to said external server via said wireless communication interface;

wherein said external server is configured to run at least one of FTP server software program, HTTP server software program, RTSP server software program; and wherein said external server is further configured to transmit at least a second portion of said compressed video file responsive to file transfer requests incoming from said playback devices connected to one of said local area network, said wide area network.

E5. The bar code reading terminal of claim E4, wherein said bar code reading terminal is further configured to, upon ascertaining that said terminal does not have direct connectivity to said external server, switch into the mesh connectivity mode and transmit said at least a portion of said compressed video file to one or more said peer terminals via said wireless communication interface; and wherein said bar code reading terminal is further configured to receive at least a portion of a video compressed file from a first peer terminal via said wireless communication interface and forward said at least a portion of a video compressed file to said external server or to a second peer terminal via said wireless communication interface.

E6. The bar code reading terminal of claim E5, wherein said mesh connectivity mode is implemented based on Dynamic Source Routing (DSR) protocol.

E7. The bar code reading terminal of claim E1, wherein said bar code reading terminal is further configured to run at least one of FTP server software program, HTTP server software program, RTSP server software program; and wherein said external server is configured to route network data packets between said bar code reading terminal and playback devices connected to one of said local area network, said wide area network.

E8. The bar code reading terminal of claim 31, wherein said bar code reading terminal is further configured to transmit at least a portion of said compressed video file responsive to file transfer requests incoming from said playback devices connected to one of said local area network, said wide area network.

E9. The bar code reading terminal of claim 31, wherein said bar code reading terminal is further configured to transmit to an Internet Protocol (IP) multicast address at least a portion of said compressed video file responsive to a user interface action.

E10. The bar code reading terminal of claim E8, wherein said bar code reading terminal is further configured to perform said transforming one or more of said captured video frames into a compressed video file format in real time synchronously with the capturing said frames; and wherein said bar code reading terminal is further configured to perform said transmission of at least a portion of said compressed video file in real time synchronously with the capturing of said frames.

E11. The bar code reading terminal of claim E9, wherein said bar code reading terminal is further configured to perform said transforming one or more of said captured video frames into a compressed video file format in real time synchronously with the capturing said frames; and wherein said bar code reading terminal is further configured to perform said transmission of at least a portion of said compressed video file in real time synchronously with the capturing of said frames.

F1. A bar code reading terminal operating in a system including a plurality of peer terminals, the bar code reading terminal comprising:

a two-dimensional image sensor;

a lens assembly focusing an image onto said two-dimensional image sensor;

a hand held housing incorporating said image sensor and said lens assembly;

at least one wireless communication interface;

a memory device;

wherein said bar code reading terminal is configured, in response to a first user interface command, to output via said user interface one or more symbolic strings describing said peer terminals;

wherein said bar code reading terminal is further configured, in response to a user selection of at least one of said symbolic strings describing said peer terminals, to start capturing video frames, transforming one or more of said captured video frames into a compressed video file format, and transmitting at least a portion of said compressed video file in real time synchronously with capturing said frames; and wherein said bar code reading terminal is further configured, in response to a second user interface command, to stop said video capturing, transforming, and transmitting operations.

F2. The bar code reading terminal of claim F1 wherein said symbolic string describing said peer terminal includes at least one of name of the operator of said peer terminal, business function of the operator of said terminal.

F3. The bar code reading terminal of claim F1 wherein said symbolic string describing said peer terminal includes the quality of wireless link between said bar code reading terminal and said peer terminal, said quality of wireless link being used by the operator of said bar code reading terminal as an estimate of the physical distance to said peer terminal.

F4. The bar code reading terminal of claim F2, wherein said bar code reading terminal is further configured to immediately before starting said capturing video frames, send message to said peer terminals selected via said user interface, wherein the message contains one or more transmission parameters to be used for video transmission.

F5. The bar code reading terminal of claim F4, wherein said bar code reading terminal further comprises an onboard display; and wherein said bar code reading terminal is further configured to upon receiving a message from an external video stream source, said message containing one or more transmission parameters to be used for video streaming, signal to the operator to attract the operator's attention, start receiving said transmission and start rendering on said onboard display the video stream received through said transmission synchronously with said external video stream source capturing said frames.

F6. The bar code reading terminal of claim F5, wherein said external video stream source being a peer bar code reading terminal.

F7. The bar code reading terminal of claim F5, wherein said external video stream source being a remote video streaming device.

F8. The bar code reading terminal of claim F5, wherein said bar code reading terminal is further configured to receive and playback audio recording synchronously with receiving and playing back said video stream transmission.

F9. The bar code reading terminal of claim F5, wherein said bar code reading terminal is further configured responsive to a user interface command, start video recording and transmission to said external video stream source thus establishing two way video-communication with said external video stream source.

F10. The bar code reading terminal of claim F8, wherein said bar code reading terminal is further configured responsive to a user interface command, start video and audio recording and transmission to said external video stream source, thus establishing two way video- and audio-communication with said external video stream source.

F11. The bar code reading terminal of claim F5, wherein said message contains at least a multicast IP address to be used for said transmission; and wherein said peer terminal is further configured to receive said transmission by subscribing to said multicast IP address.

F12. The bar code reading terminal of claim F5, wherein said message contains at least the IP address of said terminal; and wherein said peer terminal is further configured to receive said transmission by establishing an RTSP session with said terminal identified by said IP address.

G1. A video data collection system comprising:

a plurality of bar code reading terminals, each having at least a two-dimensional image sensor, a lens assembly focusing an image onto said two-dimensional image sensor, a hand held housing incorporating said image sensor and said lens assembly, at least one wireless communication interface, and a memory device;

an external server disposed remotely from said bar code reading terminal having at least one network interface capable of establishing communications with said plurality of bar code reading terminals, and at least one network interface capable of establishing communications with playback devices connected to at least one of local area network, wide area network;

wherein said bar code reading terminal is configured, in response to a first user interface command, to start storing in said memory captured video frames;

wherein said bar code reading terminal is further configured, in response to a second user interface command, to stop storing said captured video frames; and wherein said bar code reading terminal is further configured to transform one or more of said captured video frames into a compressed video file format.

G2. The video data collection system of claim G1, wherein said bar code reading terminal is further configured to transmit at least a first portion of said compressed video file to said external server via said wireless communication interface; and wherein said external server is configured to run at least one of FTP server software program, HTTP server software program, RTSP server software program.

G3. The video data collection system of claim G2, wherein said external server is further configured to transmit at least a second portion of said compressed video file responsive to file transfer requests incoming from said playback devices connected to one of said local area network, said wide area network.

G4. The video data collection system of claim G2, wherein said external server is further configured to transmit to an Internet Protocol (IP) multicast address at least a second portion of said compressed video file responsive to a user interface action.

G5. The video data collection system of claim G1, wherein said external server is configured to route network data packets between said bar code reading terminal and playback devices connected to one of said local area network, said wide area network.

G6. The video data collection system of claim G5, wherein said bar code reading terminal is further configured to transmit at least a portion of said compressed video file to responsive to file transfer requests incoming from said playback devices connected to one of said local area network, said wide area network.

G7. The video data collection system of claim G6, wherein said bar code reading terminal is further configured to transmit to an Internet Protocol (IP) multicast address at least a portion of said compressed video file responsive to a user interface action.

G8. The video data collection system of claim G6, wherein said bar code reading terminal is further configured to perform said transforming one or more of said captured video frames into a compressed video file format in real time synchronously with the capturing said frames; and wherein said bar code reading terminal is further configured to perform said transmission of at least a portion of said compressed video file in real time synchronously with the capturing of said frames.

G9. The video data collection system of claim G7, wherein said bar code reading terminal is further configured to perform said transforming one or more of said captured video frames into a compressed video file format in real time synchronously with the capturing said frames; and wherein said bar code reading terminal is further configured to perform said transmission of at least a portion of said compressed video file in real time synchronously with the capturing of said frames.

H1. A video data collection system comprising:

a plurality of bar code reading terminals, each having at least a two-dimensional image sensor, a lens assembly focusing an image onto said two-dimensional image sensor, a hand held housing incorporating said image sensor and said lens assembly, at least one wireless communication interface, and a memory device;

wherein said bar code reading terminal is configured, in response to a first user interface command to output via said user interface one or more symbolic strings describing said peer terminals;

wherein said bar code reading terminal is further configured in response to a user selection of at least one of said symbolic strings describing said peer terminals, to (i) send message to said peer terminals selected via said user interface, wherein the message contains at least one or more of the transmission parameters to be used for the video streaming;

(ii) start capturing video frames, transforming one or more of said captured video frames into a compressed video file format, and transmitting at least a portion of said compressed video file in real time synchronously with capturing said frames;

wherein said bar code reading terminal is further configured, in response to a second user interface command, to stop said video capturing, transforming and transmitting operations; and wherein said bar code reading terminal is further configured to upon receiving said message from a peer terminal signal to the operator to attract the operator's attention, start receiving said transmission, and start rendering the video stream received through said transmission on said onboard display in real time synchronously with said peer terminal capturing said frames.

H2. The video data collection system of claim H1, wherein said message contains at least a multicast IP address to be used for said transmission; and wherein said peer terminal is further configured to receive said transmission by subscribing to said multicast IP address.

H3. The video data collection system of claim H1, wherein said message contains at least the IP address of said terminal; and wherein said peer terminal is further configured to receive said transmission by establishing an RTSP session with said terminal identified by said IP address.

I1. A bar code reading terminal operating in a system including an external server, the bar code reading terminal comprising:

a two-dimensional image sensor;

a lens assembly focusing an image onto said two-dimensional image sensor;

a hand held housing incorporating said image sensor and said lens assembly;

at least one wireless communication interface;

a memory device;

wherein said bar code reading terminal further has a user interface enabling the operator of said terminal to specify the parameters of a compressed video file to be uploaded to said external server, the user interface having at least one of the following:

a data input area enabling said operator to specify one of IP address, DNS name of said external server;

a data input area enabling said operator to specify the name of the directory within the file system of said external server where said compressed video file should be uploaded;

a data input area enabling said operator to specify the name under which said compressed video file should be stored within said directory;

a data input area enabling said operator to specify a textual description of said compressed video file;

a button enabling said operator to initiate a file upload operation;

a button enabling said operator to exit said user interface without initiating a file upload operation.

J1. A bar code reading terminal operating in a system including an external server and a plurality of peer terminals, the bar code reading terminal comprising:

a two-dimensional image sensor;

a lens assembly focusing an image onto said two-dimensional image sensor;

a hand held housing incorporating said image sensor and said lens assembly;

at least one wireless communication interface;

a memory device;

wherein said bar code reading terminal further has a user interface enabling the operator of said terminal to specify the multicast parameters for a compressed video file, the user interface having at least one of the following:

a data input area enabling said operator to specify a multicast IP address for transmitting said compressed video file;

a data input area enabling said operator to specify the name of said compressed video file;

a data input area enabling said operator to specify a textual description of said compressed video file;

a button enabling said operator to initiate multicast;

a button enabling said operator to exit said user interface without initiating multicast.

K1. A bar code reading terminal operating in a system including a plurality of peer terminals, the bar code reading terminal comprising:

a two-dimensional image sensor;

a lens assembly focusing an image onto said two-dimensional image sensor;

a hand held housing incorporating said image sensor and said lens assembly;

at least one wireless communication interface;

a memory device;

wherein said bar code reading terminal further has a user interface enabling the operator of said terminal to select from a list of symbolic strings describing said peer terminals, one or more terminals to send the video stream to, the user interface having at least one of the following:

a data input area enabling said operator to select one or more of said peer terminals for transmitting a compressed video file;

a button enabling said operator to initiate video recording and transmission;

a button enabling said operator to exit said user interface without initiating video recording and transmission.

K2. The bar code reading terminal of claim K1 wherein said user interface further has a data input area enabling said operator to input a textual message to be sent to the operators of said one or more selected peer terminals.

L1. A bar code reading terminal comprising:

a two-dimensional image sensor;

a lens assembly focusing an image onto said two-dimensional image sensor;

a hand held housing incorporating said image sensor and said lens assembly;

at least one wireless communication interface;

a memory device;

wherein said bar code reading terminal is capable of capturing video frames, transforming one or more of said captured video frames into a compressed video file format, and transmitting at least a portion of said compressed video file in real time synchronously with capturing said frames;

wherein said bar code reading terminal is configured to run an HTTP server software program; and wherein said HTTP server software program is configured responsive to receiving an HTTP request from an external playback device to serve an HTML page implementing a graphical user interface, said graphical user interface allowing an operator of said external playback device to remotely control said video capturing and video transmission by said bar code reading terminal.

L2. The bar code reading terminal of claim L1 wherein said graphical user interface has a data input area enabling said operator to switch on and off said video capturing and video transmission by said bar code reading terminal.

L3. The bar code reading terminal of claim L1 wherein said graphical user interface has a data input area enabling said operator to select said video capturing frame rate.

L4. The bar code reading terminal of claim L1 wherein said graphical user interface has a data input area enabling said operator to adjust one of more values of parameters controlling said video capturing and said transforming one or more of said captured video frames into a compressed video file format, said parameters including brightness, saturation, and hue.

L5. The bar code reading terminal of claim L1 wherein said graphical user interface has a data input area enabling said operator to select a compressed video file from a list of compressed video files previously recorded by said bar code reading terminal; and wherein said bar code reading terminal, responsively to a user interface action, starts transmitting said compressed video file to said playback device.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

The invention claimed is:

1. An imaging terminal comprising:
an image sensor;
a lens assembly for focusing an image onto the image sensor;
at least one wireless communication interface;
a memory;
instructions stored in the memory which upon execution are operative for:
capturing video frames using the image sensor;
attempting to decode frames of the captured video frames for decodable indicia;
transforming one or more of the captured video frames into a compressed video file format;
transmitting at least a portion of the compressed video file to an external computing device; and
receiving inputs from the external computing device via the wireless communication interface, wherein the received inputs are to remotely control the imaging terminal and the received inputs correspond to at least one of, a control command to switch on or switch off the capturing of the video and one of more values of parameters controlling the capturing of the video frames and the transforming of the captured video frames into the compressed video file format, wherein the parameters include at least one of brightness, saturation, and hue.

2. The imaging terminal of claim 1, wherein the instructions stored in the memory which upon execution are operative for marking one or more captured video frames related to a failed attempt to read a decodable indicia.

3. The imaging terminal of claim 2, wherein the instructions stored in the memory which upon execution are operative for displaying the marked one or more captured video frames to an operator.

4. The imaging terminal of claim 1, wherein the instructions stored in the memory which upon execution are operative for, in response to a successful attempt to decode frames of the captured video frames for decodable indicia, transfer the decoded indicia data to another server system.

5. The imaging terminal of claim 1, wherein the instructions stored in the memory which upon execution are operative for, in response to a successful attempt to decode frames of the captured video frames for decodable indicia, store the decoded indicia data in the memory.

6. The imaging terminal of claim 1, wherein the instructions stored in the memory which upon execution are operative for, in response to a successful attempt to decode frames of the captured video frames for decodable indicia, display the decoded indicia data on a display of the imaging terminal.

7. The imaging terminal of claim 1, wherein the instructions stored in the memory which upon execution are operative for, in response to a successful attempt to decode frames of the captured video frames for decodable indicia:
transfer the decoded indicia data to another server system;
store the decoded indicia data in the memory; and/or
display the decoded indicia data on a display of the imaging terminal.

8. An imaging terminal comprising:
an image sensor;
a lens assembly focusing an image onto the image sensor;
at least one wireless communication interface;
a memory;
instructions stored in the memory which upon execution are operative for:
capturing video frames using the image sensor;
attempting to decode frames of the captured video frames for decodable indicia;
transforming one or more of the captured video frames into a compressed video file format; and
transmitting via the wireless communication interface at least a portion of the compressed video file to one or more peer terminal devices; and
a graphical user interface (GUI) to provide a list of active peer terminals and a link quality indicative of signal strength associated with each of the active peer terminals;
wherein an operator of the imaging terminal for transmitting the portion of compressed video file selects one or more active peer terminals from the list based on the link quality associated with each of the active peer terminals.

9. The imaging terminal of claim 8, wherein the instructions stored in the memory which upon execution are operative for marking one or more captured video frames related to a failed attempt to read a decodable indicia.

10. The imaging terminal of claim 9, wherein the instructions stored in the memory which upon execution are operative for displaying the marked one or more captured video frames to an operator.

11. The imaging terminal of claim 8, wherein the instructions stored in the memory which upon execution are operative for, in response to a successful attempt to decode frames of the captured video frames for decodable indicia, transfer the decoded indicia data to another server system.

12. The imaging terminal of claim 8, wherein the instructions stored in the memory which upon execution are operative for, in response to a successful attempt to decode frames of the captured video frames for decodable indicia, store the decoded indicia data in the memory.

13. The imaging terminal of claim 8, wherein the instructions stored in the memory which upon execution are operative for, in response to a successful attempt to decode frames of the captured video frames for decodable indicia, display the decoded indicia data on the graphical user interface.

14. The imaging terminal of claim 8, wherein the instructions stored in the memory which upon execution are operative for, in response to a successful attempt to decode frames of the captured video frames for decodable indicia:
transfer the decoded indicia data to another server system;
store the decoded indicia data in the memory; and/or
display the decoded indicia data on the graphical user interface.

15. An imaging terminal comprising:
an image sensor;
a lens assembly focusing an image onto the image sensor;
at least one wireless communication interface;
a memory;
instructions stored in the memory which upon execution are operative for:
capturing video frames using the image sensor;
attempting to decode frames of said the captured video frames for decodable indicia; and
transforming one or more of the captured video frames into a compressed video file format; and a graphical user interface (GUI) for uploading the compressed video file to a server, wherein the GUI provides an interface for receiving inputs related to at least one of a server name, an internet protocol (IP) address associated with a server, a file name, and a file description for the compressed video file, wherein the compressed video file is to be processed for determining a defect associated with the imaging terminal and wherein the processing includes determining if the imaging terminal was in motion while capturing the frames and an association of a saturation condition with the captured frames.

16. The imaging terminal of claim 15, wherein the instructions stored in the memory which upon execution are operative for marking one or more captured video frames related to a failed attempt to read a decodable indicia.

17. The imaging terminal of claim 16, wherein the instructions stored in the memory which upon execution are operative for displaying the marked one or more captured video frames to an operator.

18. The imaging terminal of claim 15, wherein the instructions stored in the memory which upon execution are operative for, in response to a successful attempt to decode frames of the captured video frames for decodable indicia, transfer the decoded indicia data to another server system.

19. The imaging terminal of claim 15, wherein the instructions stored in the memory which upon execution are operative for, in response to a successful attempt to decode frames of the captured video frames for decodable indicia, store the decoded indicia data in the memory.

20. The imaging terminal of claim 15, wherein the instructions stored in the memory which upon execution are operative for, in response to a successful attempt to decode frames of the captured video frames for decodable indicia:
   transfer the decoded indicia data to another server system;
   store the decoded indicia data in the memory; and/or
   display the decoded indicia data on the graphical user interface.

* * * * *